(12) United States Patent
Ito

(10) Patent No.: US 8,315,001 B2
(45) Date of Patent: Nov. 20, 2012

(54) LENS BARREL

(75) Inventor: Daisuke Ito, Osaka (JP)

(73) Assignee: Panasonic Corporation, Osaka (JP)

( * ) Notice: Subject to any disclaimer, the term of this patent is extended or adjusted under 35 U.S.C. 154(b) by 228 days.

(21) Appl. No.: 12/853,439

(22) Filed: Aug. 10, 2010

(65) Prior Publication Data

US 2010/0302657 A1    Dec. 2, 2010

Related U.S. Application Data

(62) Division of application No. 12/341,510, filed on Dec. 22, 2008, now Pat. No. 7,796,347.

(30) Foreign Application Priority Data

Dec. 28, 2007    (JP) ................................. 2007-340583

(51) Int. Cl.
*G02B 7/02*    (2006.01)

(52) U.S. Cl. ........................................ 359/819

(58) Field of Classification Search ............ 359/811, 359/819
See application file for complete search history.

(56) References Cited

U.S. PATENT DOCUMENTS

| | | | |
|---|---|---|---|
| 4,264,178 A | 4/1981 | Muryoi | |
| 5,946,519 A | 8/1999 | Chao et al. | |
| 7,446,962 B2 | 11/2008 | Matsumoto et al. | |
| 7,626,773 B2 * | 12/2009 | Noda et al. | ..................... 359/819 |
| 7,760,996 B2 | 7/2010 | Miyamori et al. | |
| 7,796,347 B2 | 9/2010 | Ito | |
| 2002/0159774 A1 | 10/2002 | Koyama et al. | |
| 2004/0223234 A1 | 11/2004 | Konno | |
| 2005/0168834 A1 | 8/2005 | Matsumoto et al. | .......... 359/694 |
| 2008/0056698 A1 | 3/2008 | Lee et al. | |

FOREIGN PATENT DOCUMENTS

| | | |
|---|---|---|
| CN | 101140351 | 3/2008 |
| JP | 2000-310803 A | 11/2000 |
| JP | 2001-281513 | 10/2001 |
| JP | 2002-131611 A | 5/2002 |
| JP | 2002-258132 | 9/2002 |
| JP | 2003-241056 A | 8/2003 |
| JP | 2005-351932 A | 12/2005 |
| JP | 2006-091370 A | 4/2006 |

(Continued)

OTHER PUBLICATIONS

International Search Report of PCT Application No. PCT/JP2008/003944 dated Feb. 3, 2009.

*Primary Examiner* — Joseph P Martinez
(74) *Attorney, Agent, or Firm* — Panasonic Patent Center

(57) ABSTRACT

A lens barrel has a first lens group, a second lens group, a third lens group, a first support frame for supporting the first lens group, a second support frame for supporting the second lens group, a first driving unit, a shutter unit, and an aperture unit. The first lens group has an overall negative refractive power, and includes a prism. The second support frame is driven along a second optical axis by the first driving unit. The shutter unit has a shutter mechanism, a shutter drive motor configured to drive the shutter mechanism, a neutral density filter, and a filter drive motor configured to drive the neutral density filter. The shutter drive motor and the filter drive motor are disposed flanking the second optical axis when viewed in a direction along the second optical axis.

20 Claims, 21 Drawing Sheets

FOREIGN PATENT DOCUMENTS

| | | |
|---|---|---|
| JP | 2006-322984 A | 11/2006 |
| JP | 2007-017957 A | 1/2007 |
| JP | 3925457 B | 6/2007 |
| JP | 2007-199402 | 8/2007 |
| JP | 2007-271649 A | 10/2007 |
| JP | 2007-271670 | 10/2007 |
| JP | 2007-292997 | 11/2007 |

\* cited by examiner

LENS BARREL

CROSS-REFERENCE TO RELATED APPLICATIONS

This application claims priority to Japanese Patent Application No. 2007-340583 filed on Dec. 28, 2007. The entire disclosure of Japanese Patent Application No. 2007-340583 is hereby incorporated herein by reference.

BACKGROUND

1. Technical Field

The technical field relates to a lens barrel having a bending optical system.

2. Description of the Related Art

Digital cameras that make use of imaging elements have become very popular in recent years. With digital camera, there has been a need not only for a greater number of pixels in the imaging elements, but also for higher performance of the lens barrel, which forms an optical image on the imaging elements. More specifically, there is a need for a lens barrel equipped with a higher-power zoom lens system.

In the field of digital cameras, the overall size of the camera needs to be reduced in order to make it more portable. Accordingly, there has been a need for a more compact imaging device including a lens barrel and imaging elements, as this is considered one way to reduce the overall size of the camera. For instance, as disclosed in Japanese Patent 3,925,457 and Japanese Laid-Open Patent Applications 2007-17957, 2007-271649, and 2005-351932, there have been proposals for so-called bending optical systems, in which the optical path is bent along a zoom lens system, in order to reduce the size of the imaging device.

SUMMARY

A conventional lens barrel is provided with a shutter unit for opening up and blocking off the optical path. This shutter unit has a shutter mechanism, a shutter drive motor for opening and closing the shutter mechanism, a filter provided so as to be capable of being inserting into and retracted from the optical path, and a filter drive motor for driving the filter. The shutter drive motor and the filter drive motor are disposed close to the shutter mechanism and the filter.

However, depending on how these drive motors are disposed, they may hinder efforts to reduce the size of the lens barrel.

It is an object to obtain a smaller lens barrel.

A lens barrel according to a first aspect is a lens barrel for forming an optical image of a subject, including a first lens group, a second lens group, a third lens group, a first support frame, a first support mechanism, and an optical path blocking unit. The first lens group takes in a light beam coming from the subject along a first optical axis, and has a bending optical element with which the light beam incident along the first optical axis is reflected in a direction along a second optical axis that intersects the first optical axis. The second lens group takes in the light beam that has passed through the first lens group. The third lens group takes in the light beam that has passed through the second lens group. The first support frame supports the first lens group. The first support mechanism supports the second lens group to be movable along the second optical axis with respect to the first lens group, and has a second support frame for supporting the second lens group. The optical path blocking unit has an optical path blocking mechanism provided to be capable of opening and blocking off the optical path along the second optical axis, a blocking drive motor that drives the optical path blocking mechanism, an optical element provided to be capable of being inserted into the optical path along the second optical axis and being retracted from the optical path, and an element drive motor that drives the optical element. The blocking drive motor and the element drive motor are disposed flanking the second optical axis when viewed in a direction along the second optical axis.

With this lens barrel, since the blocking drive motor and the element drive motor are disposed flanking the second optical axis when viewed in a direction along the second optical axis, the optical path blocking unit is longer in one direction, but the length is shorter in the other direction of the optical path blocking unit. This affords a more compact lens barrel.

A lens barrel according to a second aspect is the lens barrel of the first aspect, further including a second support mechanism that supports the third lens group to be movable along the second optical axis with respect to the first lens group, and has a third support frame supporting the third lens group and a second guide shaft arranged to guide the third support frame in a direction along the second optical axis. The first support mechanism has a first guide shaft arranged to guide the second support frame in a direction along the second optical axis. The first and second guide shafts are disposed flanking the second optical axis when viewed in a direction along the second optical axis.

A lens barrel according to a third aspect is the lens barrel of the second aspect, wherein the first guide shaft is disposed closer to either the blocking drive motor or the element drive motor when viewed in a direction along the second optical axis, and the second guide shaft is disposed closer to the other of the blocking drive motor and the element drive motor.

A lens barrel according to a fourth aspect is the lens barrel of the second aspect, wherein the blocking drive motor and the second guide shaft are disposed on one side with respect to a face including the first optical axis and the second optical axis. The element drive motor and the first guide shaft are disposed on the other side with respect to a face including the first optical axis and the second optical axis. The first guide shaft is disposed in front of the element drive motor when viewed from the side on which the blocking drive motor is disposed in front of the second guide shaft and in a direction along the first optical axis.

A lens barrel according to a fifth aspect is the lens barrel of the second aspect, wherein the blocking drive motor and the first guide shaft are disposed on one side with respect to a face including the first optical axis and the second optical axis. The element drive motor and the second guide shaft are disposed on the other side with respect to a face including the first optical axis and the second optical axis. The second guide shaft is disposed in front of the element drive motor when viewed from the side on which the blocking drive motor is disposed in front of the first guide shaft and in a direction along the first optical axis.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Overview of Digital Camera

Figure 1:
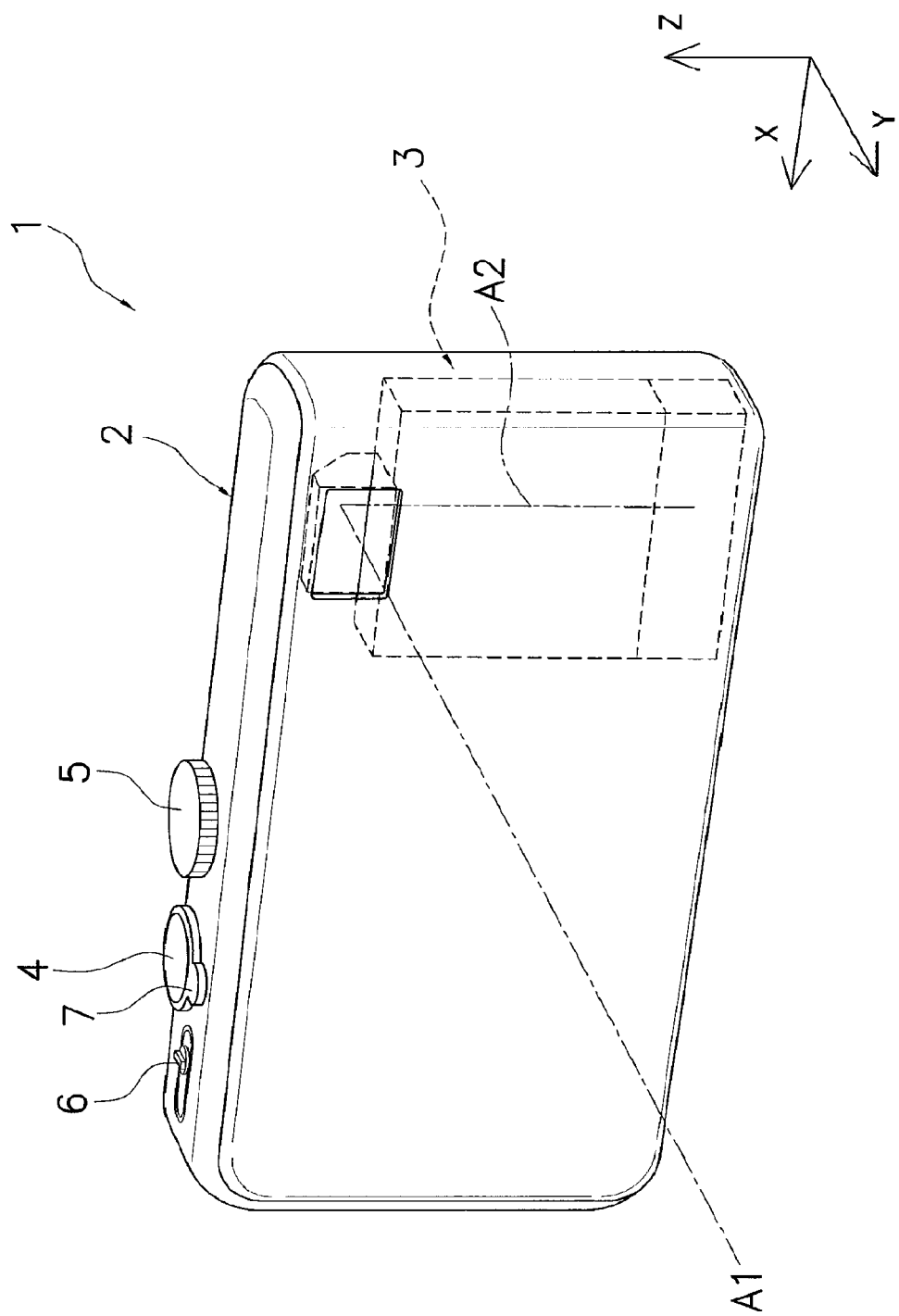
FIG. 1 is a simplified perspective view of a digital camera.
Figure 2:
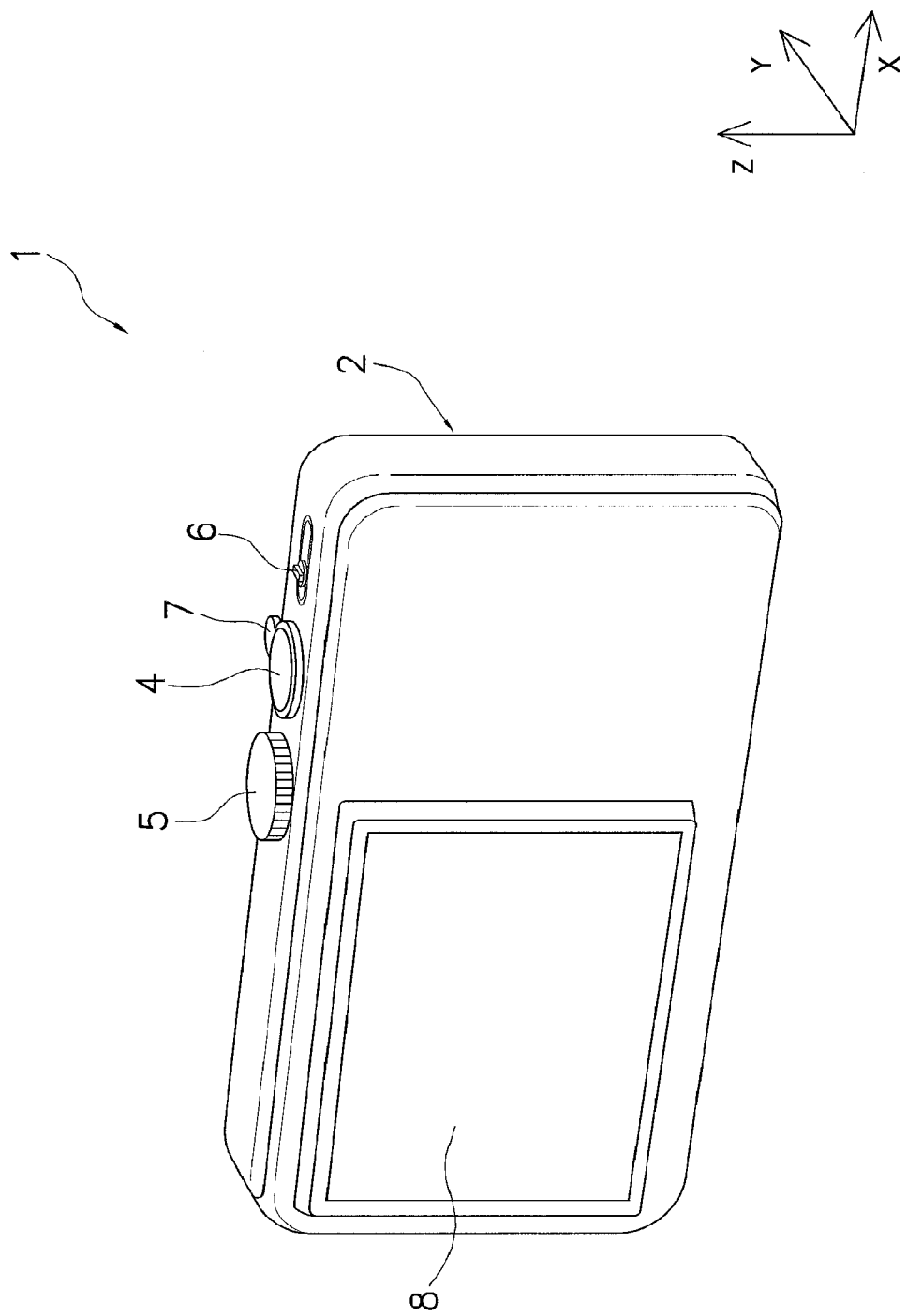
FIG. 2 is a simplified perspective view of a digital camera.

A digital camera 1 according to an embodiment of the present invention will now be described through reference to FIGS. 1 and 2. FIGS. 1 and 2 are simplified perspective views of the digital camera 1.

The digital camera 1 is a camera for capturing an image of a subject, and employs a bending optical system for boosting magnification and reducing the overall size.

In the following description, the six sides of the digital camera 1 are defined as follows.

The side facing the subject when an image is being captured by the digital camera 1 is called the front face of a camera main body 2, and the face on the opposite side is called the rear face. When an image is captured such that the top and bottom in the vertical direction of the subject match up with the top and bottom in the short-side direction of the rectangular image being captured by the digital camera 1 (the aspect ratio (the ratio of long to short sides) is generally 3:2, 4:3, 16:9, etc.), the side facing upward in the vertical direction is called the top face, and the opposite side is called the bottom face. Further, when the an image is captured such that the top and bottom in the vertical direction of the subject match up with the top and bottom in the short-side direction of the rectangular image being captured by the digital camera 1, the side that is on the left when viewed from the subject side is called the left face, and the opposite side is called the right face. The above definitions are not intended to limit the usage orientation of the digital camera 1.

Based on the above definitions, FIG. 1 is a perspective view illustrating the front face, top face, and right face.

The same definitions apply not only to the six sides of the digital camera 1, but also to the six sides of the various constituent members disposed on the digital camera 1. That is, the above definitions apply to the six sides of the various constituent members when they have been disposed in the digital camera 1.

As shown in FIG. 1, a three-dimensional perpendicular coordinate system is defined, having a Y axis perpendicular to the front face of the camera main body 2. Based on this definition, the direction facing the front face side from the rear face side is called the Y axis positive direction, the direction facing the left face side from the right face side is called the X axis positive side, and the direction facing the top face side from the bottom face side and perpendicular to the X and Y axes is called the Z axis positive direction.

The drawings will be described below using this XYZ coordinate system as a reference. That is, the X axis positive side, the Y axis positive direction, and the Z axis positive direction in the drawings each refer to the same respective direction.

Overall Configuration of Digital Camera

Figure 3:
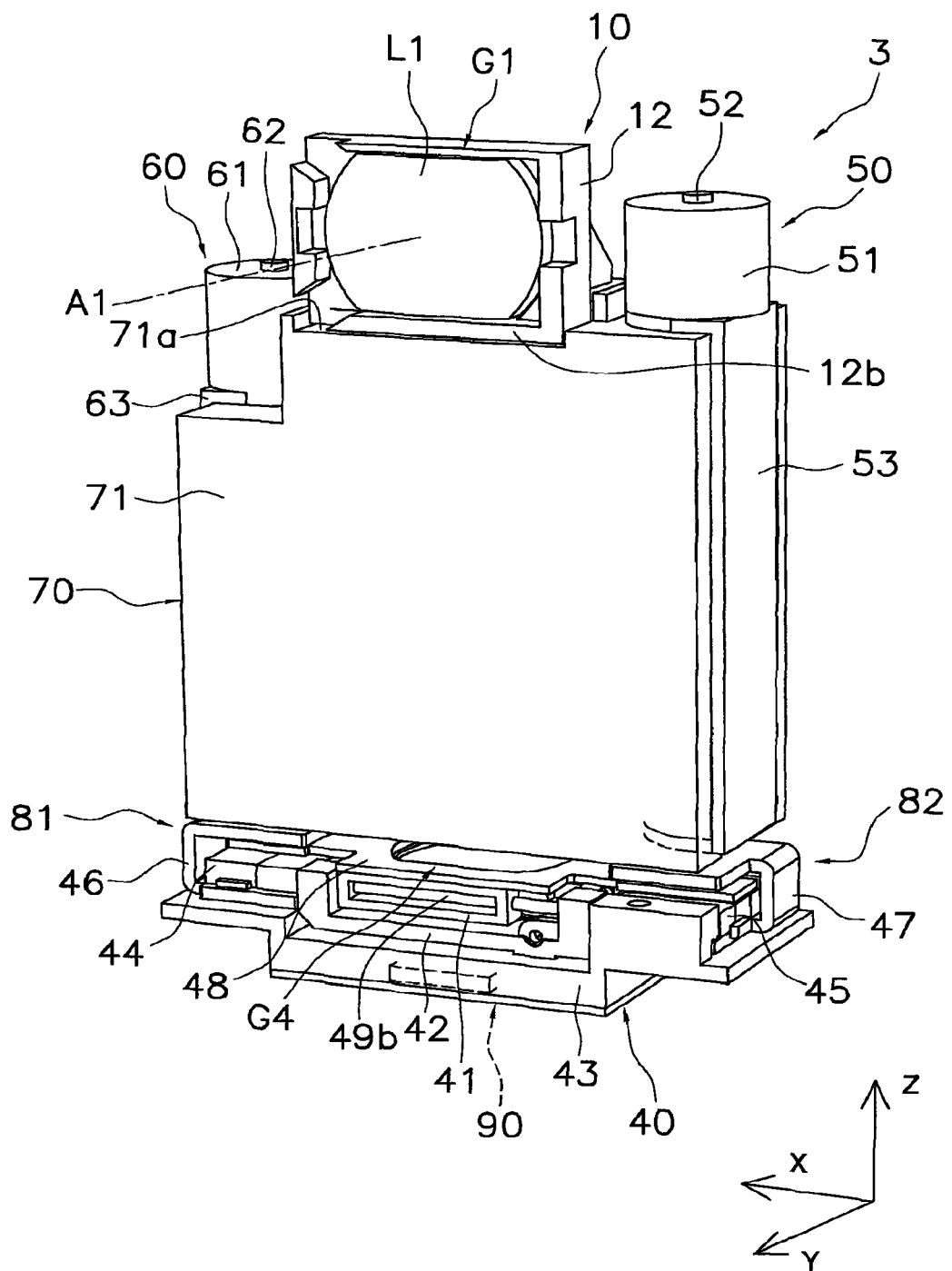
FIG. 3 is a simplified perspective view of a lens barrel.

As shown in FIGS. 1 and 2, the digital camera 1 mainly includes a camera main body 2 that houses various units, a lens barrel 3 for forming an optical image of a subject, and an imaging unit 90 (See FIG. 3). The imaging unit 90 has an imaging element 91 for converting an optical image into an image signal (See FIG. 4). Examples of the imaging element 91 include a CCD (charge coupled device) and a CMOS (complementary metal-oxide semiconductor) sensor.

A release button 4, a control dial 5, a power switch 6, and a zoom adjusting lever 7 are provided to the top face of the camera main body 2 so that the user can control the imaging operation, etc. The release button 4 is used by the user to input the exposure timing. The control dial 5 is used by the user to make various settings related to imaging operation.

The power switch 6 is used by the user to turn the digital camera 1 on or off. The zoom adjusting lever 7 is used by the user to adjust the zoom magnification, and is able to rotate around the release button 4 within a specific angular range. A liquid crystal monitor 8 that displays images captured by the imaging element 91 is arranged on the rear face of the camera main body 2.

Configuration of Lens Barrel

Figure 4:
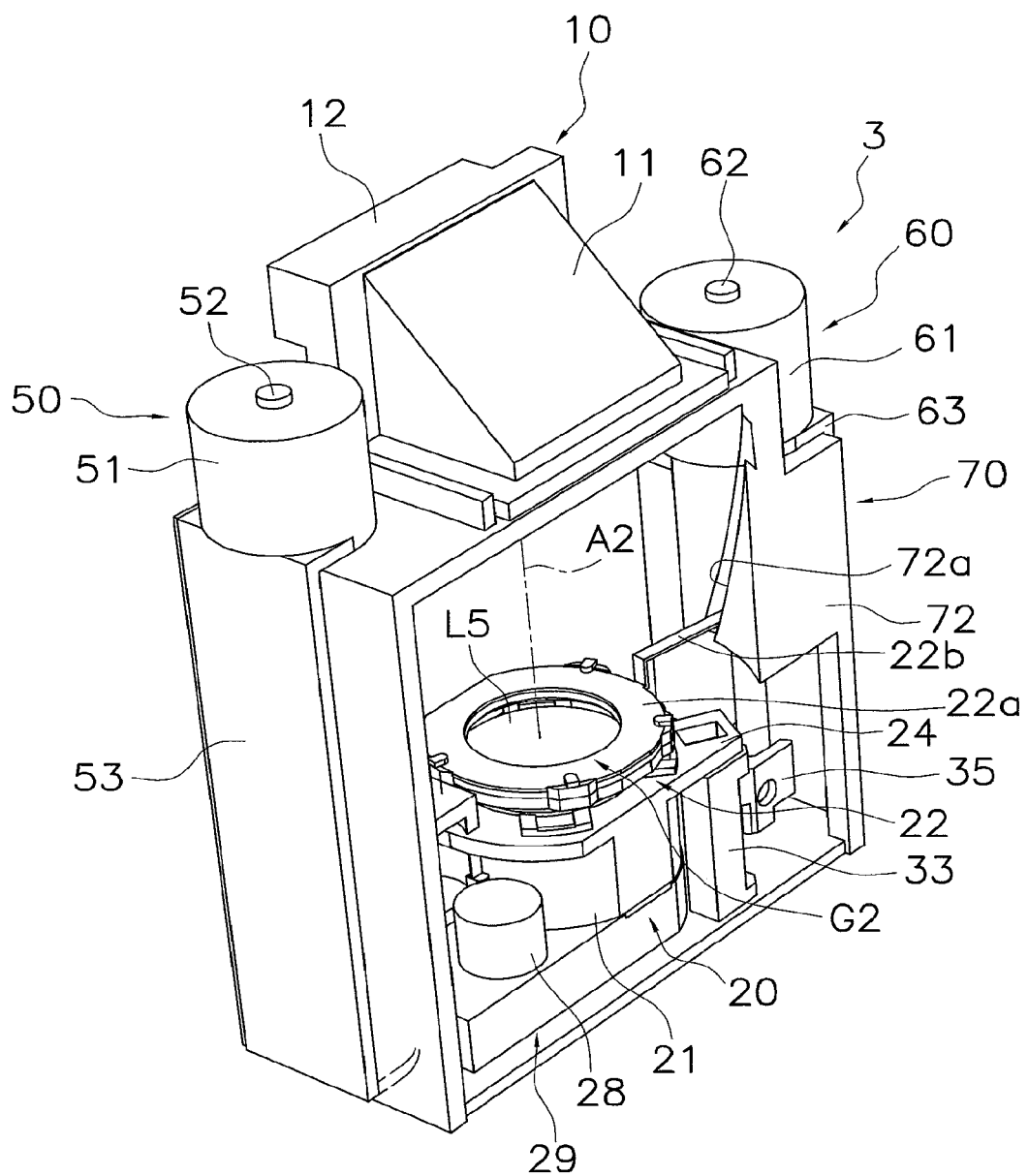
FIG. 4 is a simplified perspective view of a lens barrel.
Figure 5:
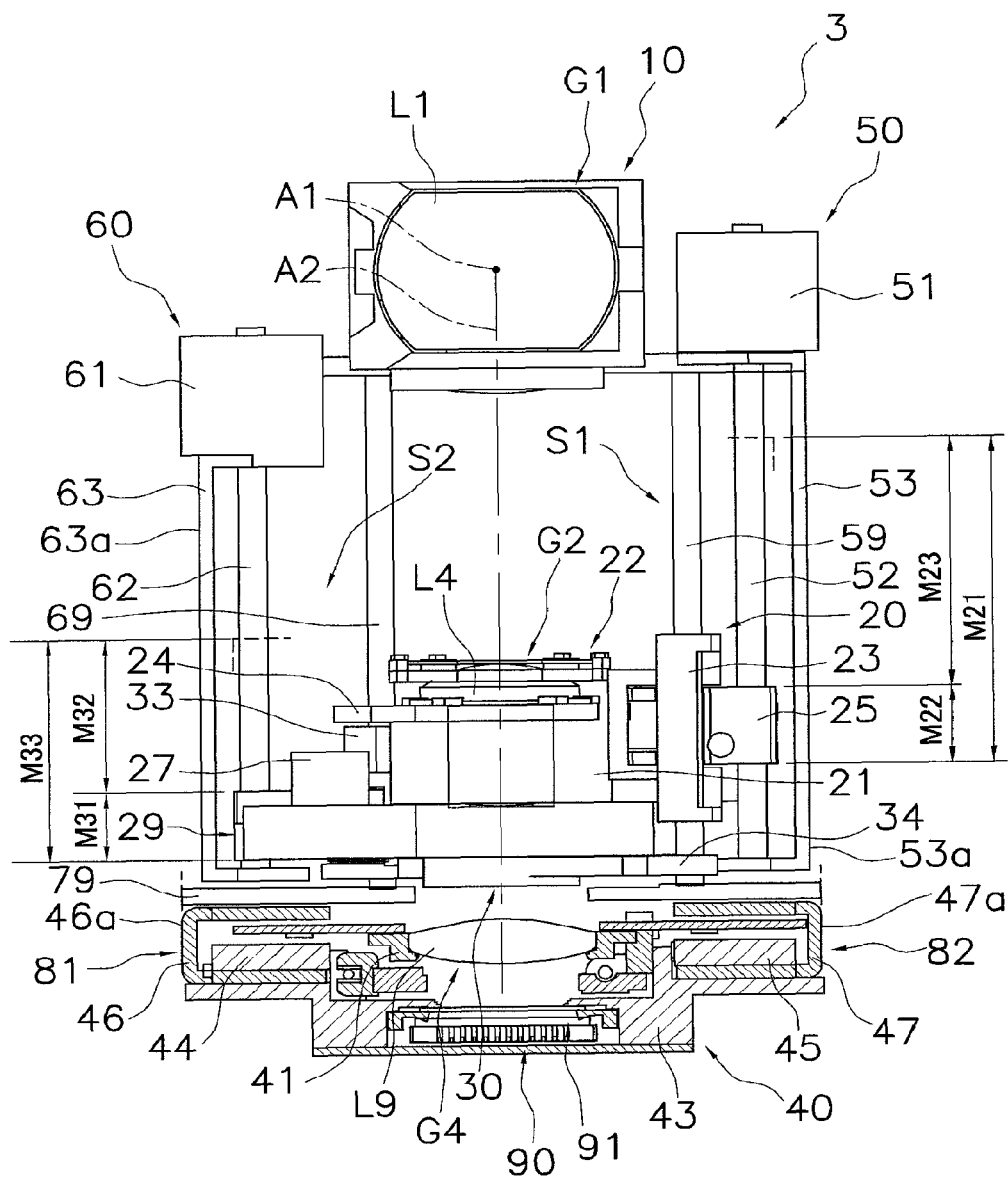
FIG. 5 is a front view of a lens barrel.
Figure 6:
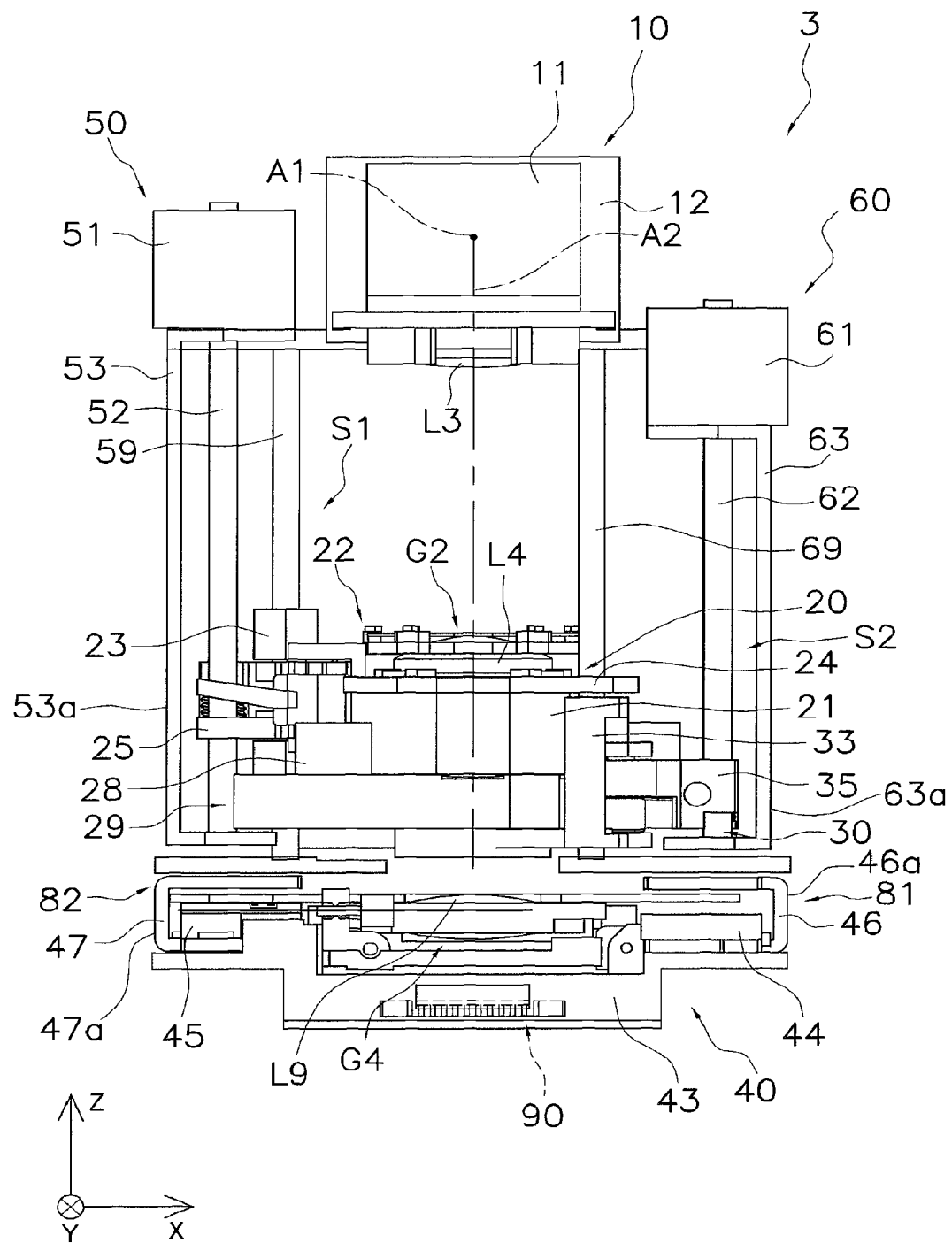
FIG. 6 is a rear view of a lens barrel.
Figure 7:
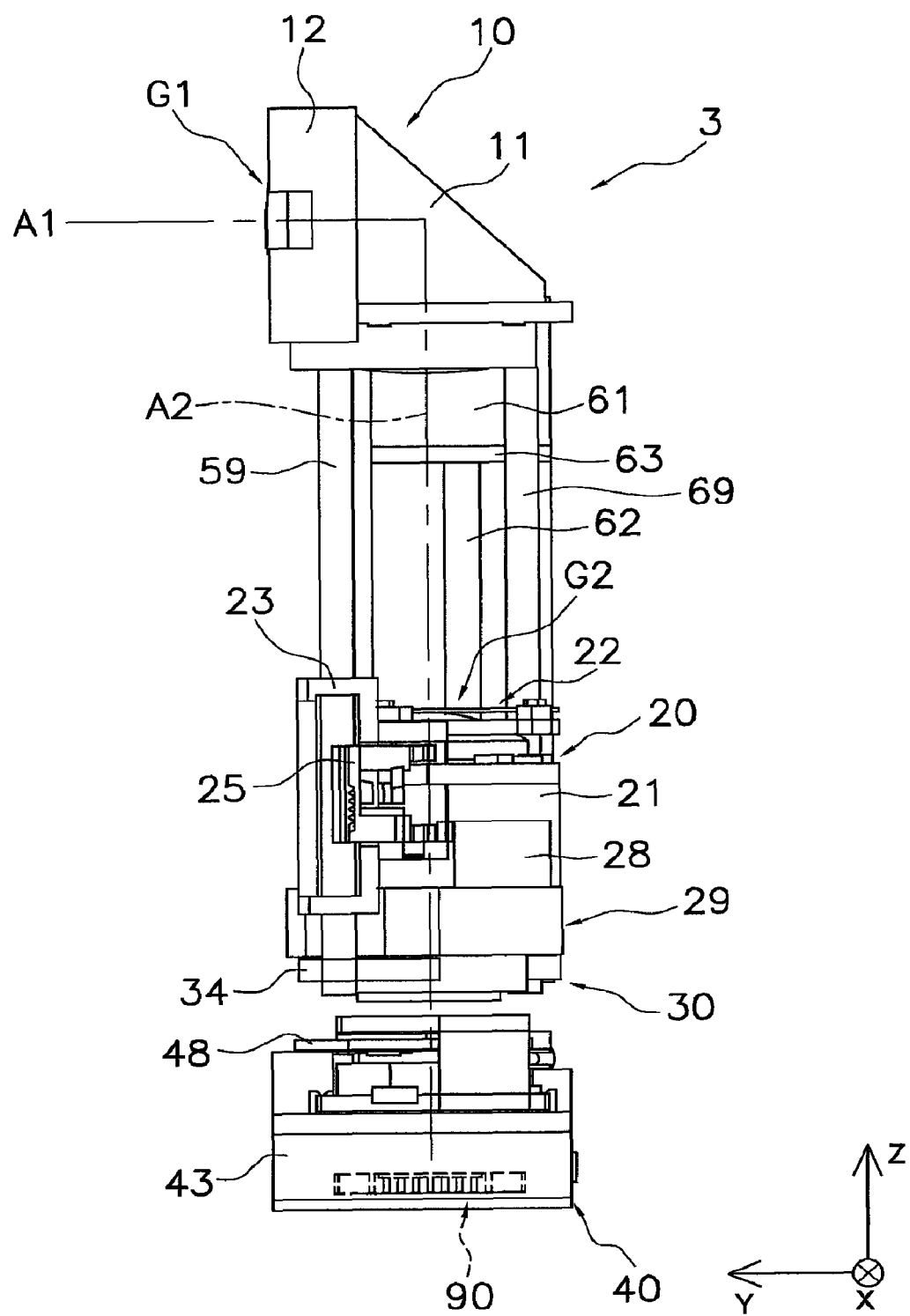
FIG. 7 is a side view of a lens barrel.
Figure 8:
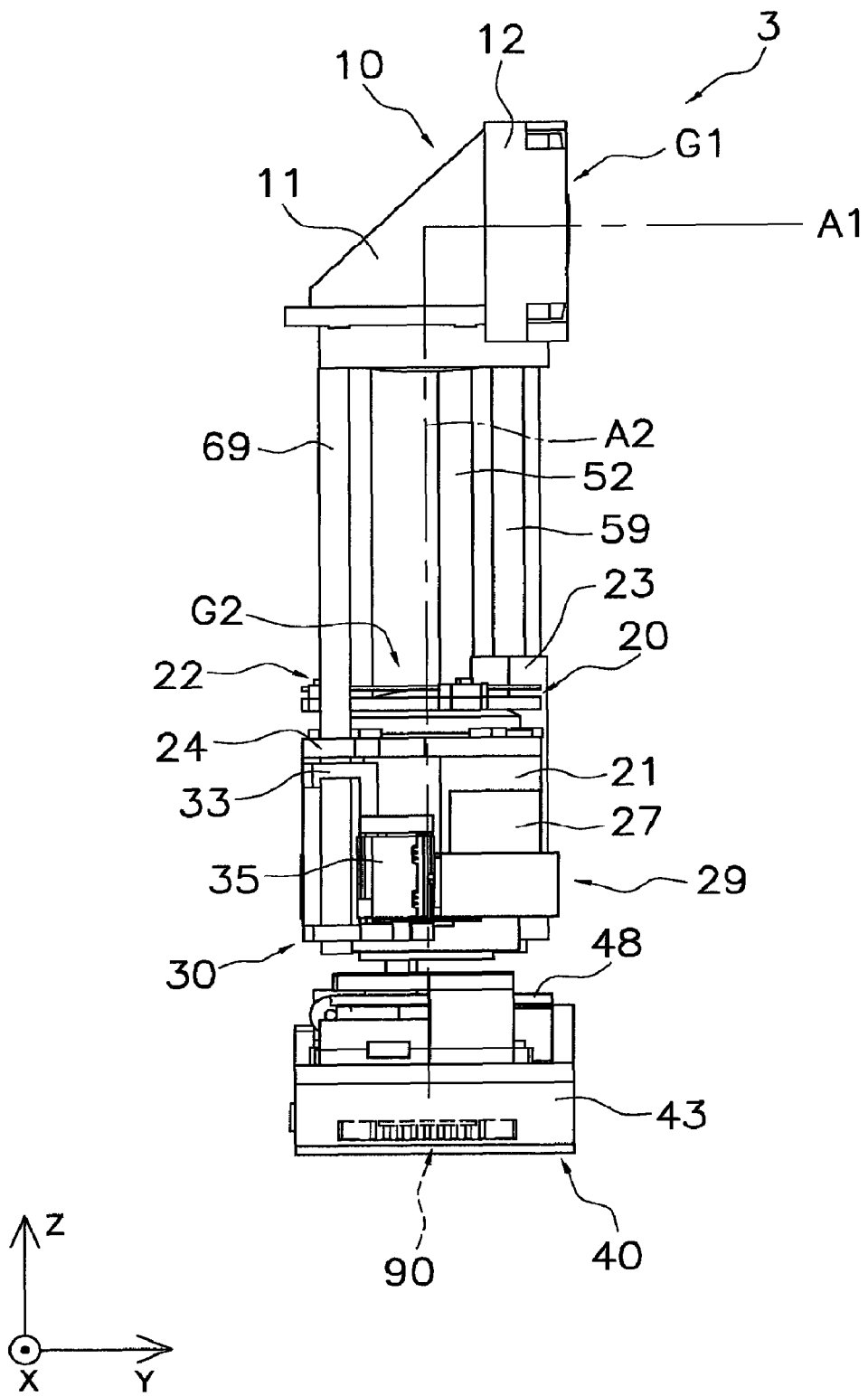
FIG. 8 is a side view of a lens barrel.

The configuration of the lens barrel 3 will be described with reference to FIGS. 3 to 21. FIGS. 3 and 4 are simplified perspective views of the lens barrel 3. FIG. 5 is a front view of the lens barrel 3. FIG. 6 is a rear view of the lens barrel 3. FIGS. 7 and 8 are side views of the lens barrel 3. In FIGS. 5 to 8, part of a main body frame 70 is omitted so that the internal structure of the lens barrel 3 can be seen.

Figure 9:
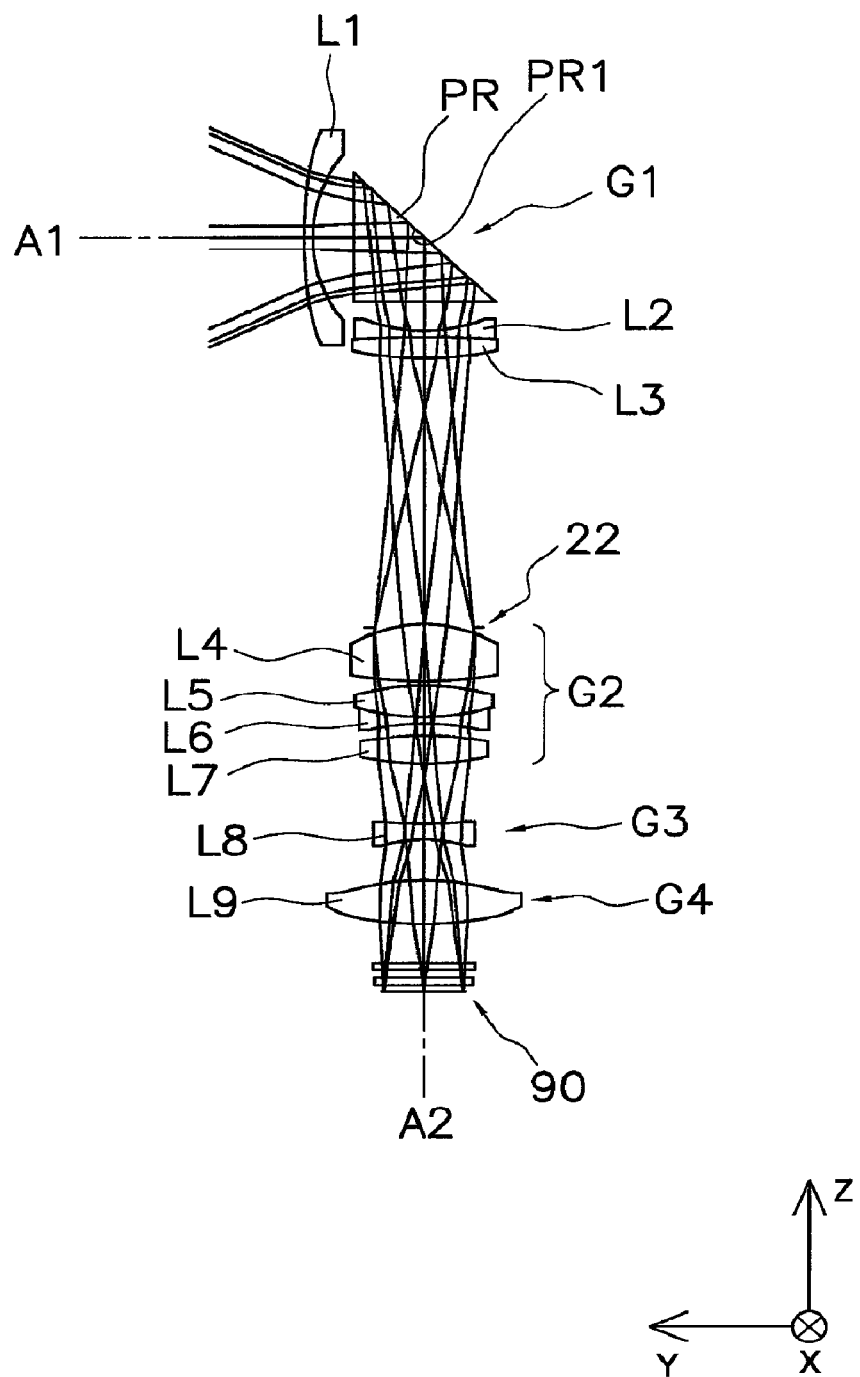
FIG. 9 is a diagram of the configuration of an imaging optical system.
Figure 10:
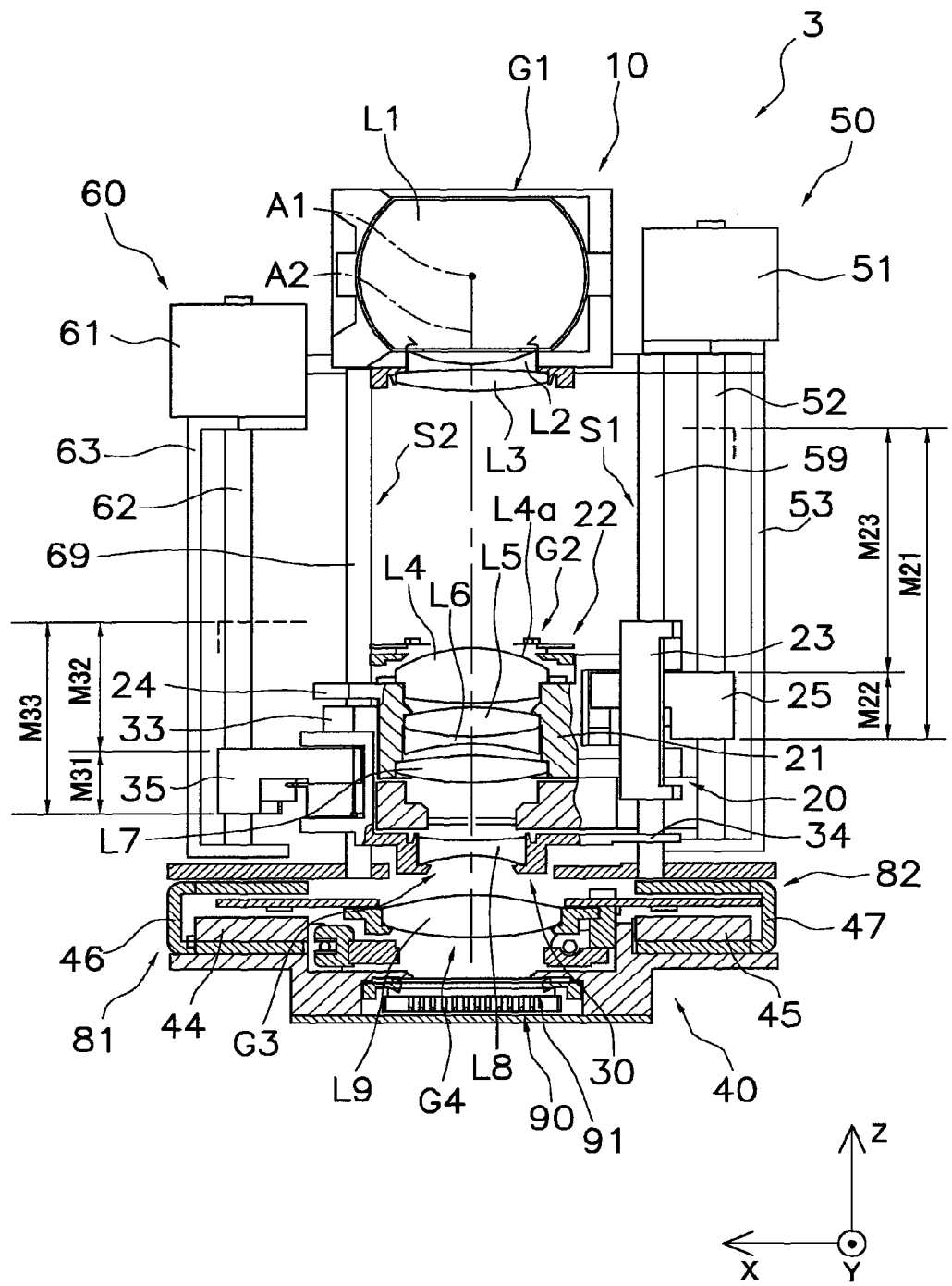
FIG. 10 is a simplified cross section of a lens barrel.
Figure 11:
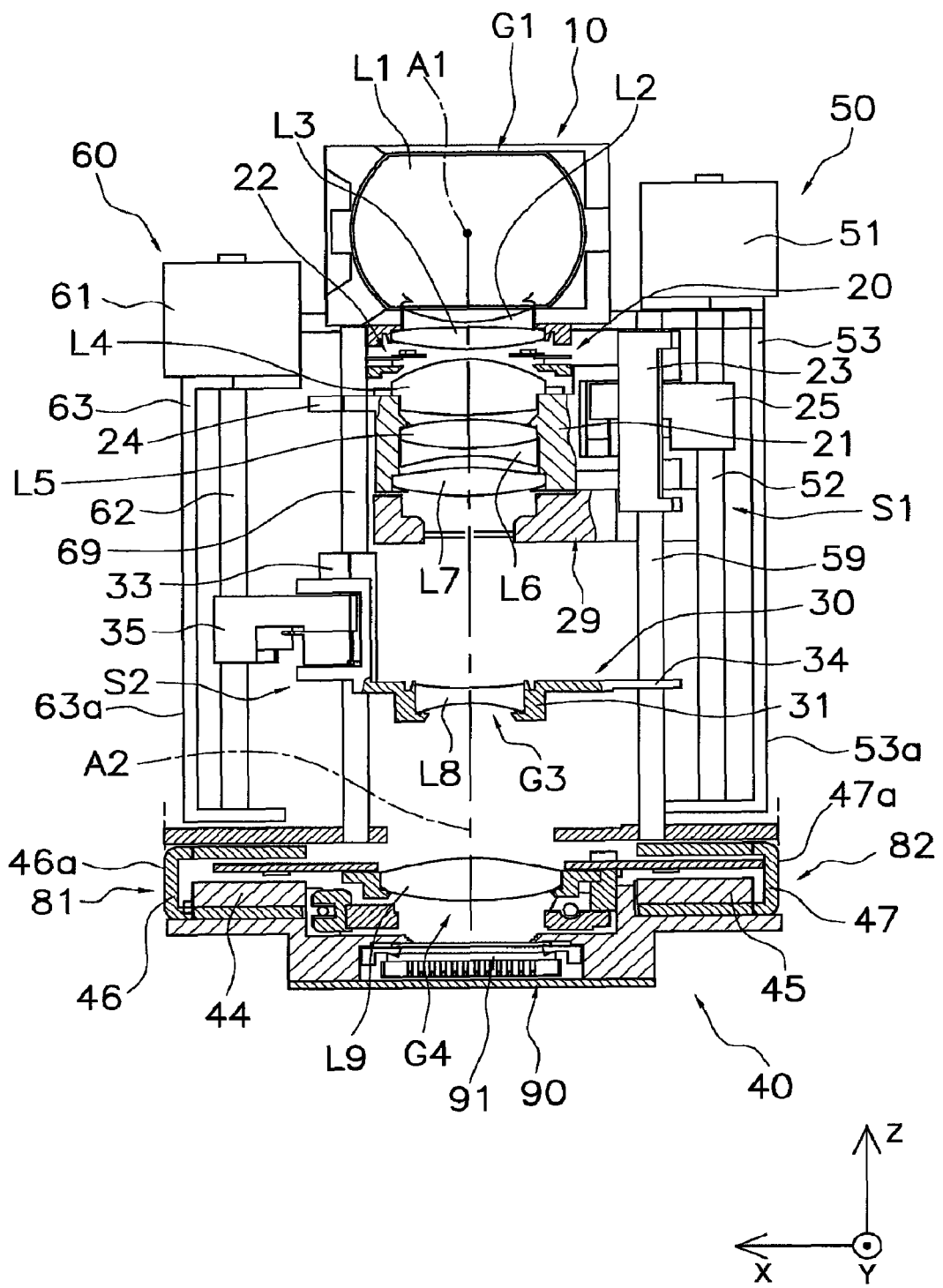
FIG. 11 is a simplified cross section of a lens barrel.
Figure 12:
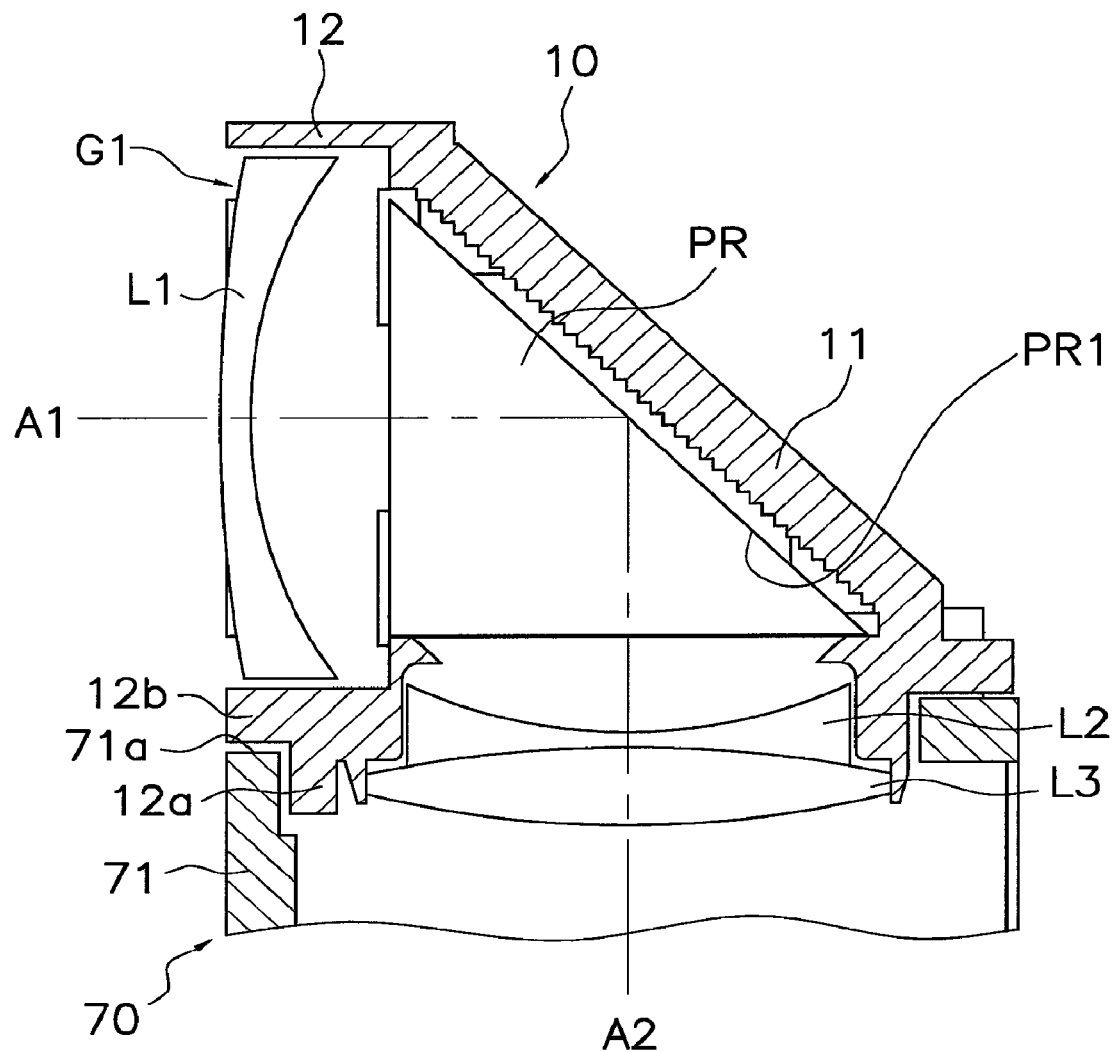
FIG. 12 is a cross section of a first lens group and the surrounding area.
Figure 12:
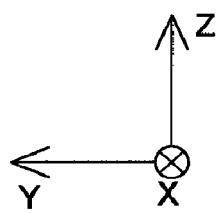
Figure 13:
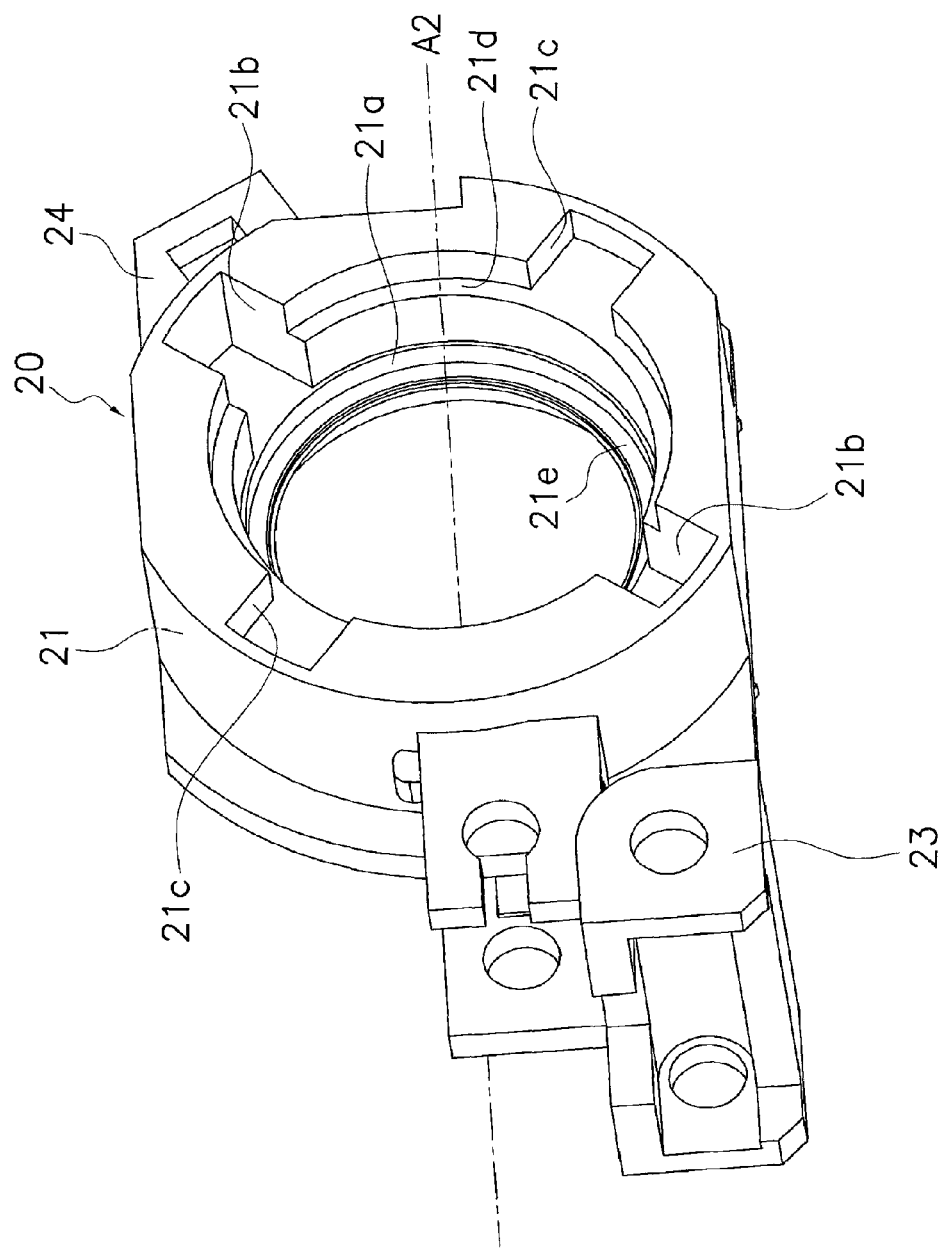
FIG. 13 is a perspective view of a second support frame.
Figure 14B:
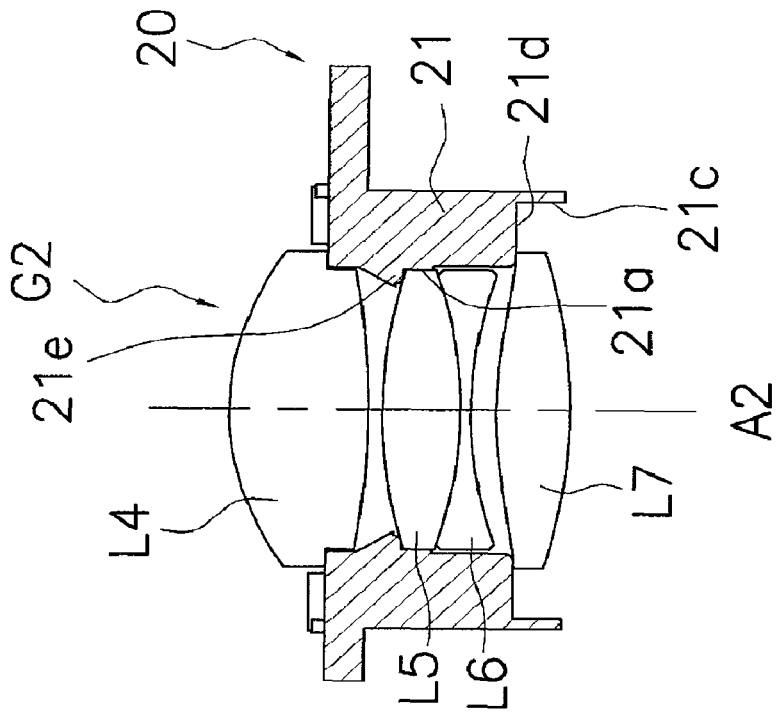
FIGS. 14A and 14B are cross sections of a second lens group and a second support frame.
Figure 14A:
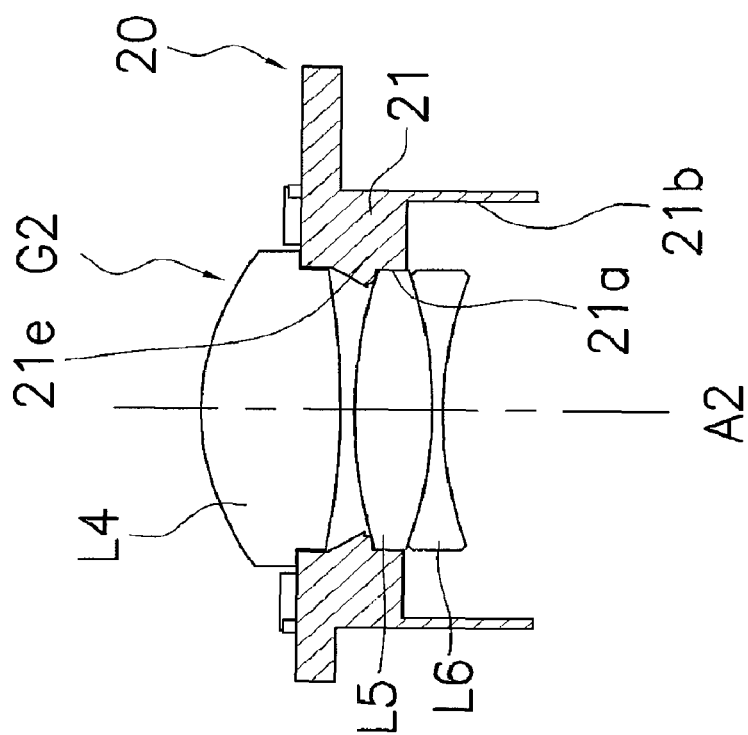
Figure 15A:
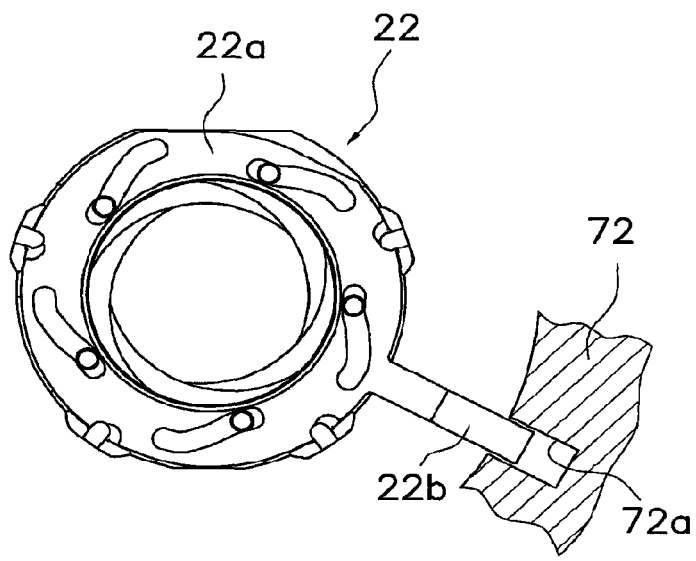
FIGS. 15A and 15B are plan views of an aperture unit.
Figure 15B:
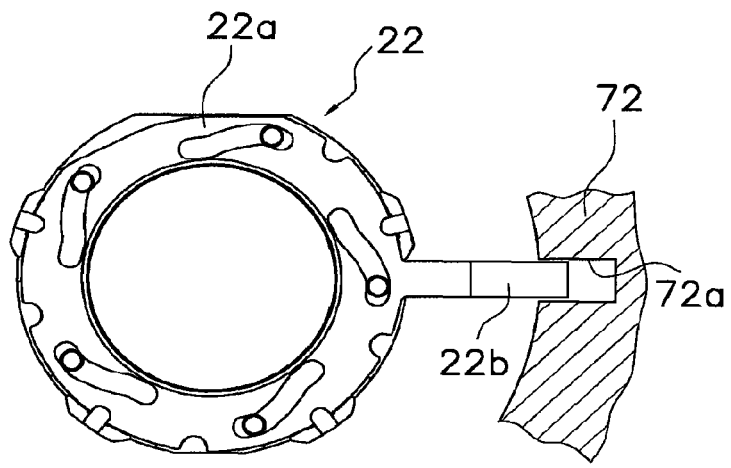
Figure 15B:
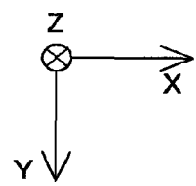

FIG. 9 is a diagram of the configuration of an imaging optical system. FIG. 9 shows a wide angle state. FIGS. 10 and 11 are simplified cross sections of the lens barrel 3. FIG. 10 shows the wide angle state, and FIG. 11 shows a telephoto state. FIG. 12 is a cross section of a first lens group G1 and the surrounding area. FIG. 13 is a perspective view of a second support frame 20. FIGS. 14A and 14B are cross sections of a second lens group G2 and the second support frame 20. In FIG. 14A, a seventh lens L7 is omitted. FIGS. 15A and 15B are plan views of an aperture unit 22. FIG. 15A shows a stopped state, and FIG. 15B shows an open state.

Figure 16:
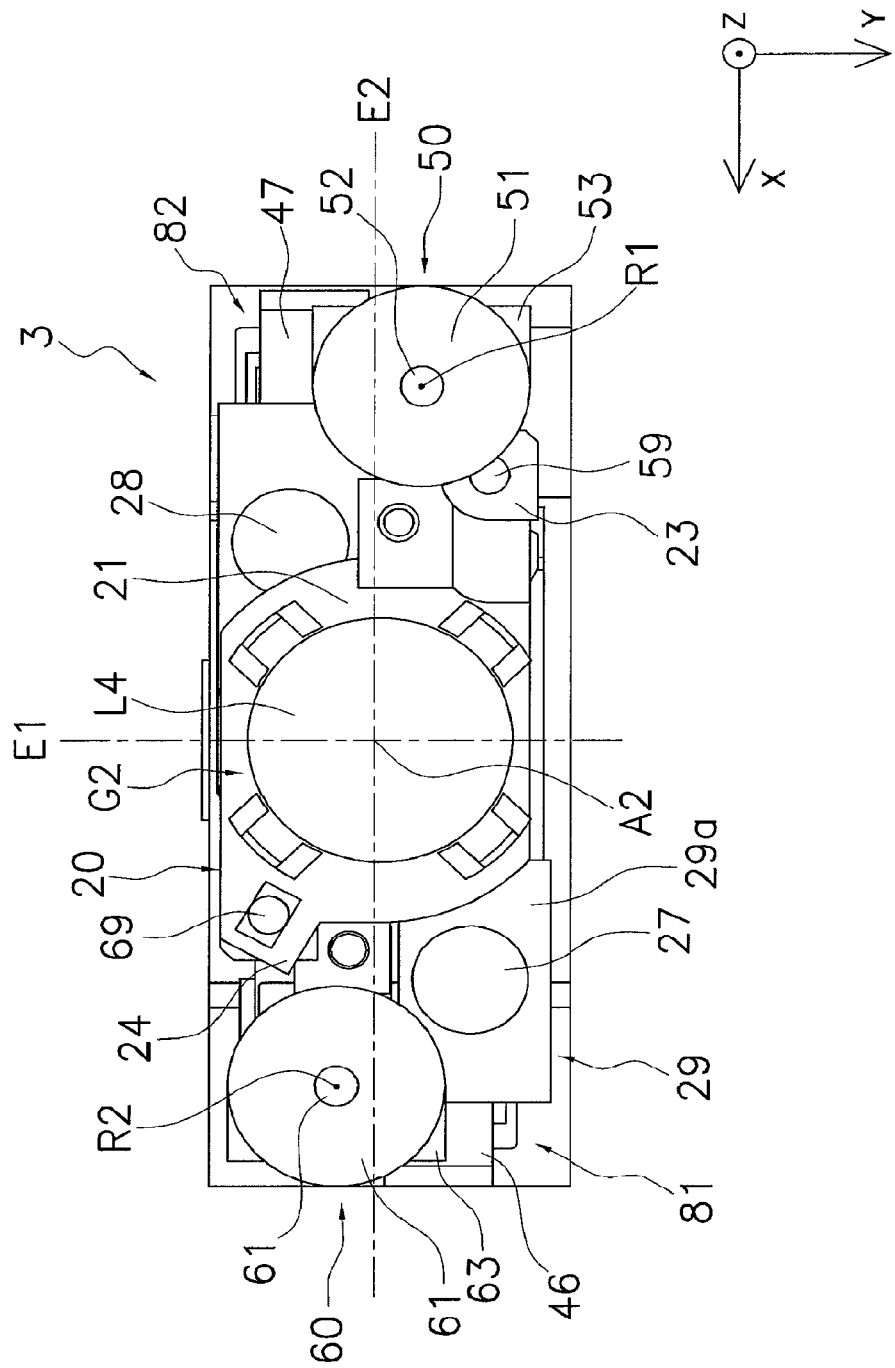
FIG. 16 is a simplified plan view of a lens barrel.
Figure 17:
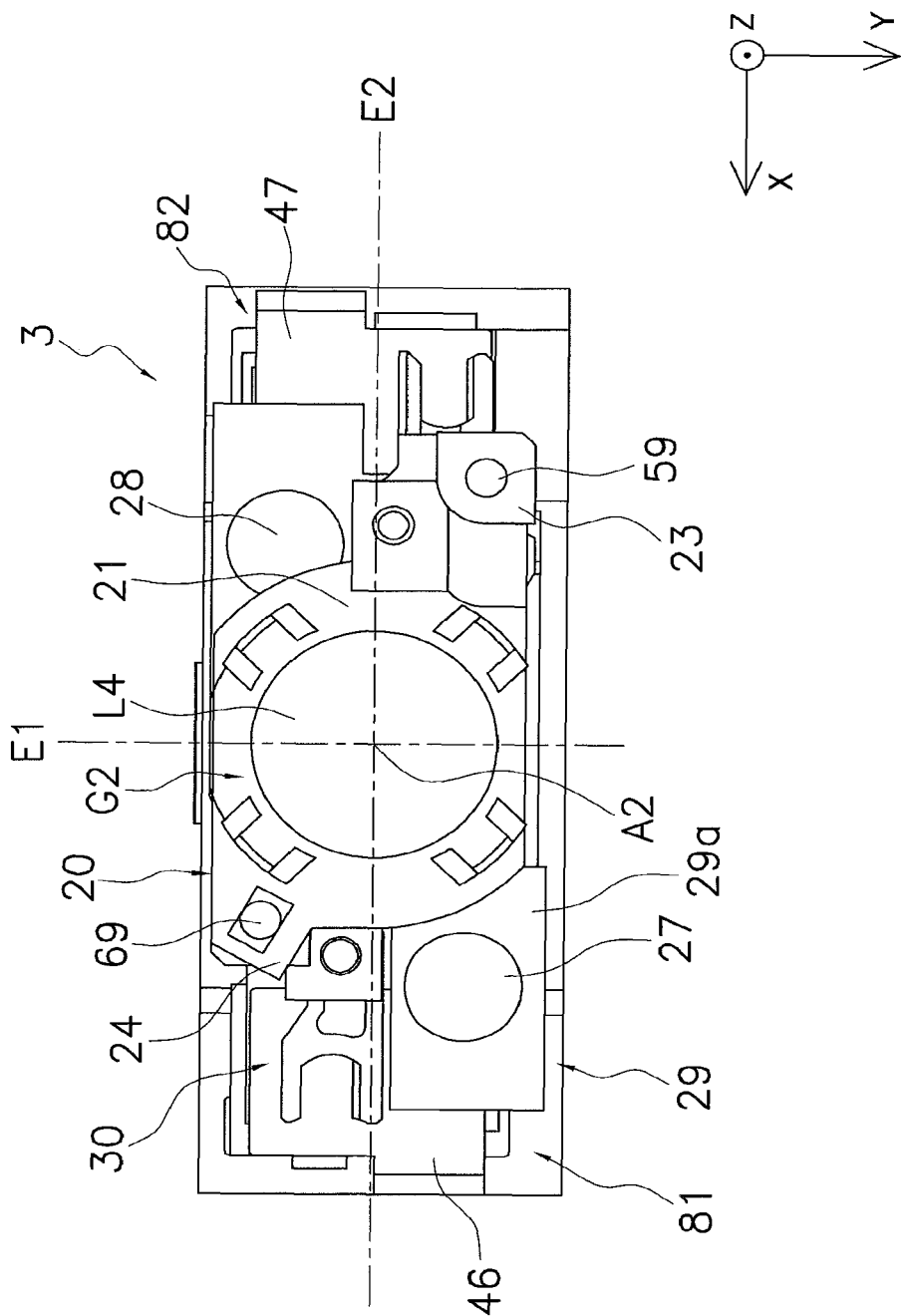
FIG. 17 is a simplified plan view of a lens barrel.
Figure 18:
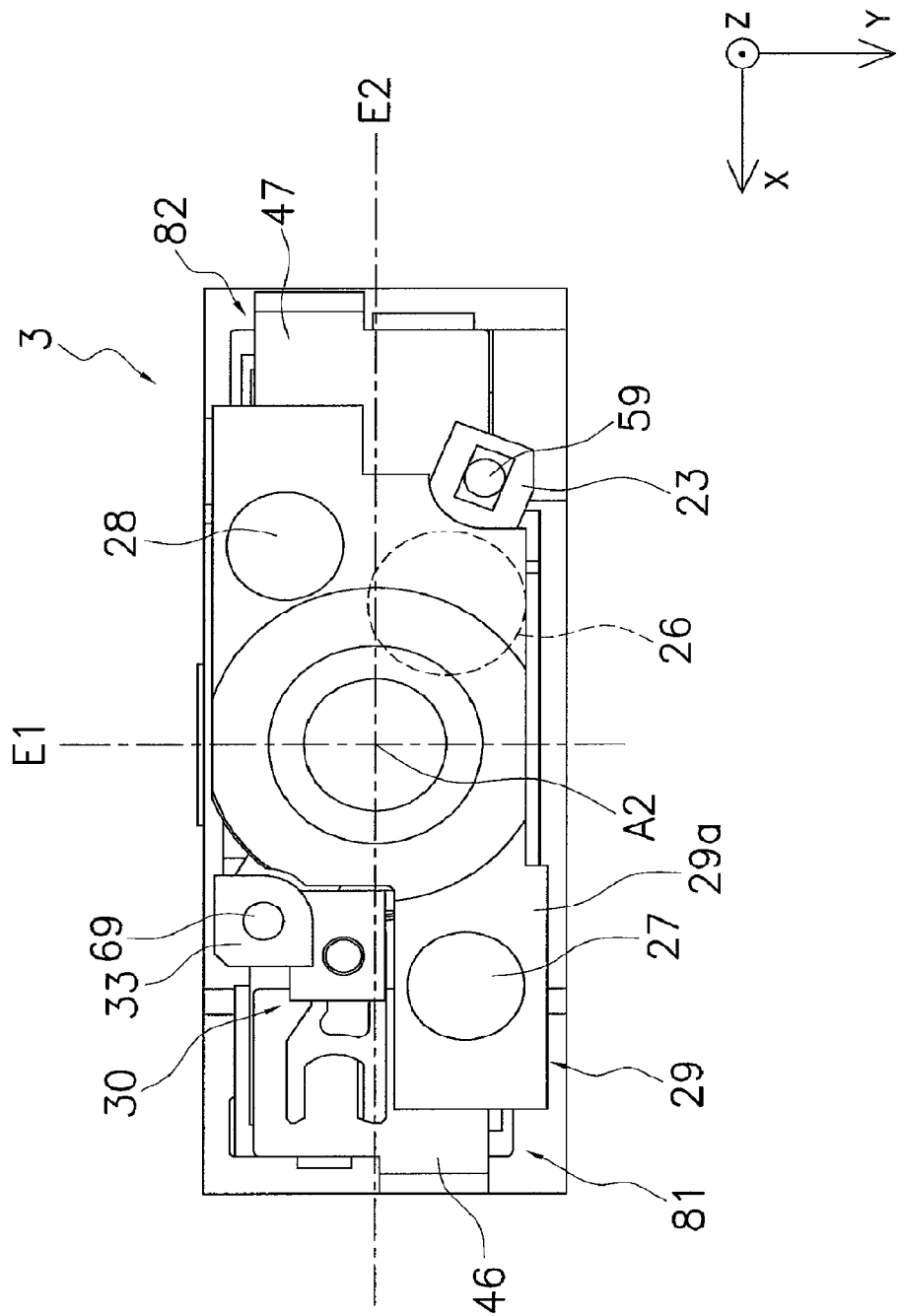
FIG. 18 is a simplified plan view of a lens barrel.
Figure 19:
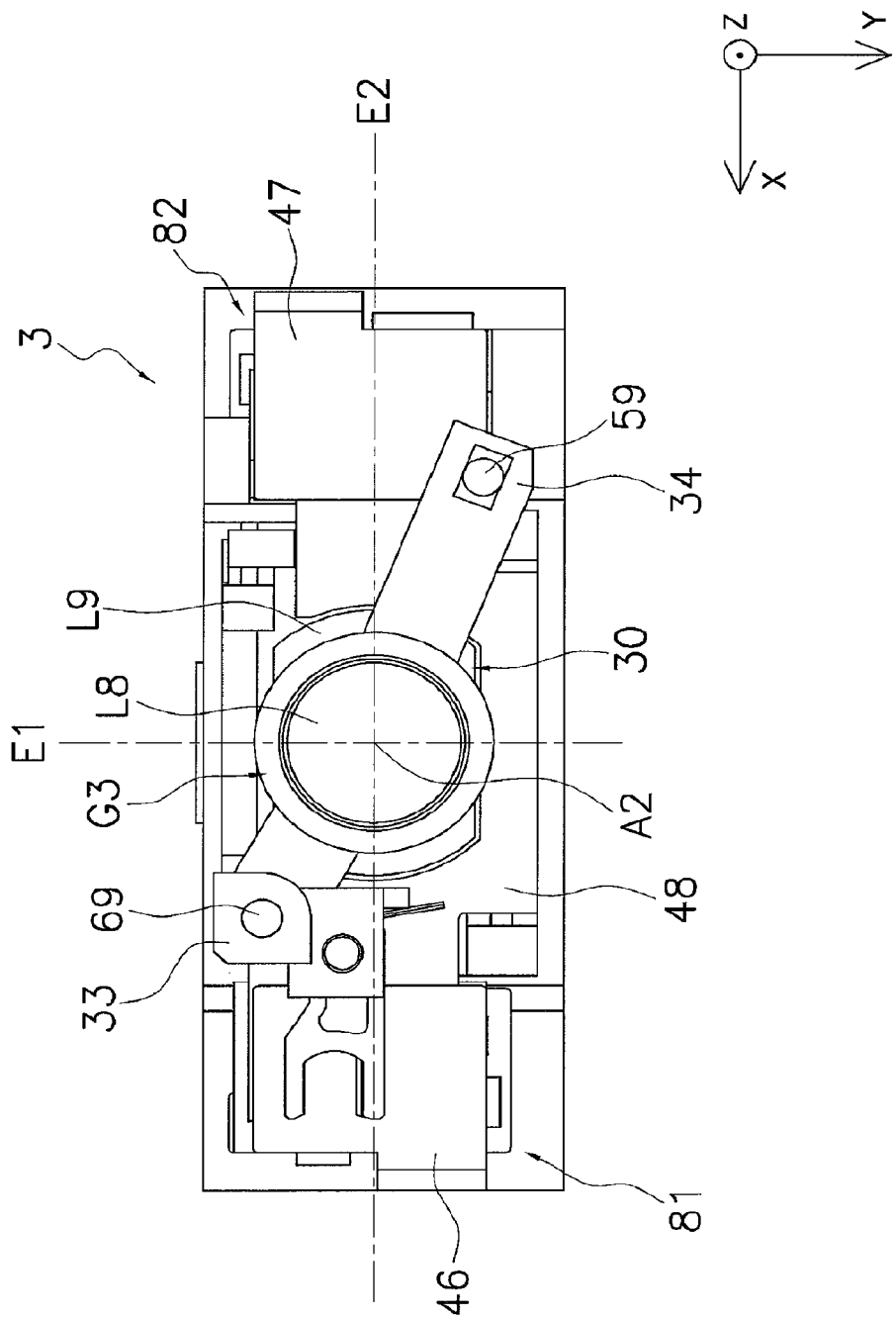
FIG. 19 is a simplified plan view of a lens barrel.
Figure 20:
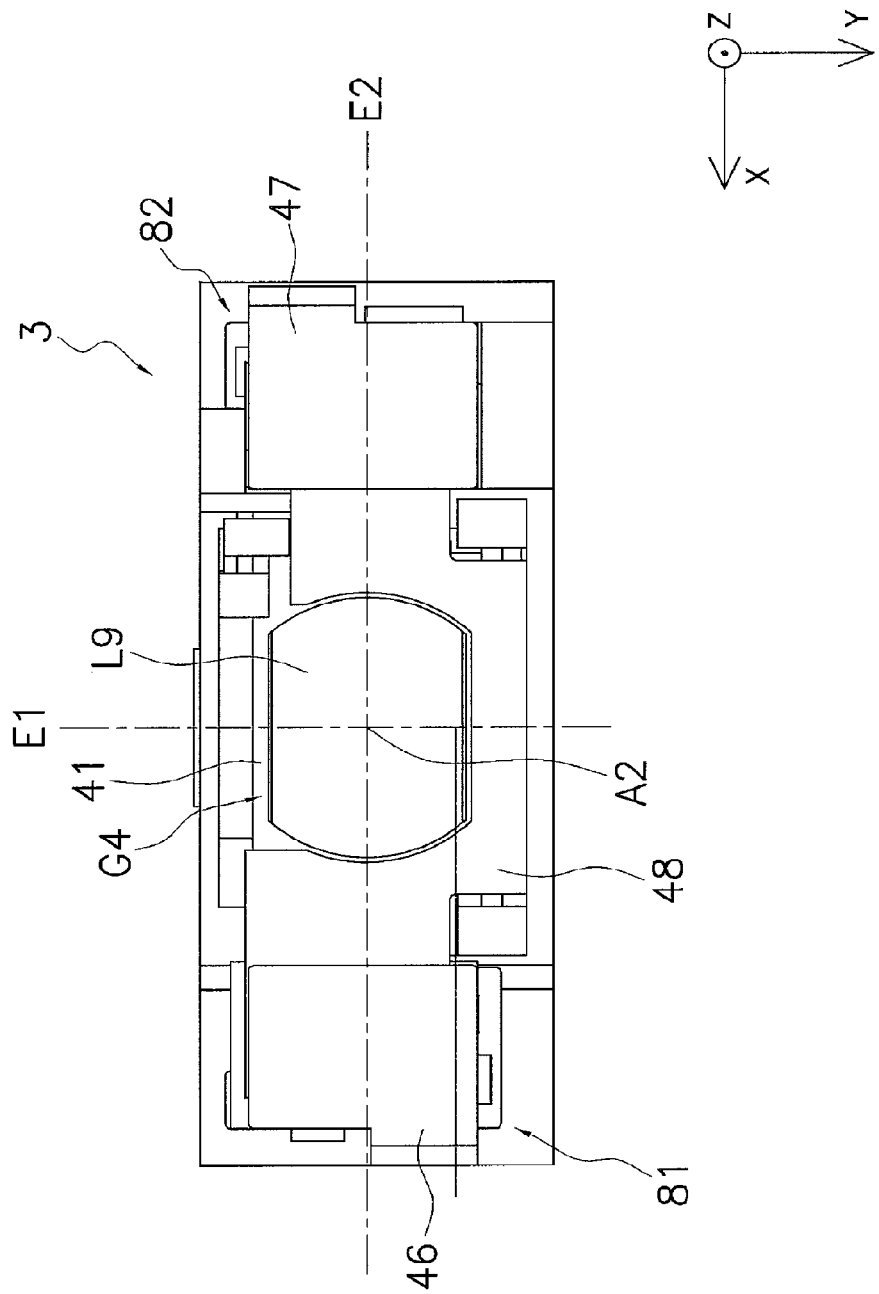
FIG. 20 is a simplified plan view of a lens barrel.
Figure 21:
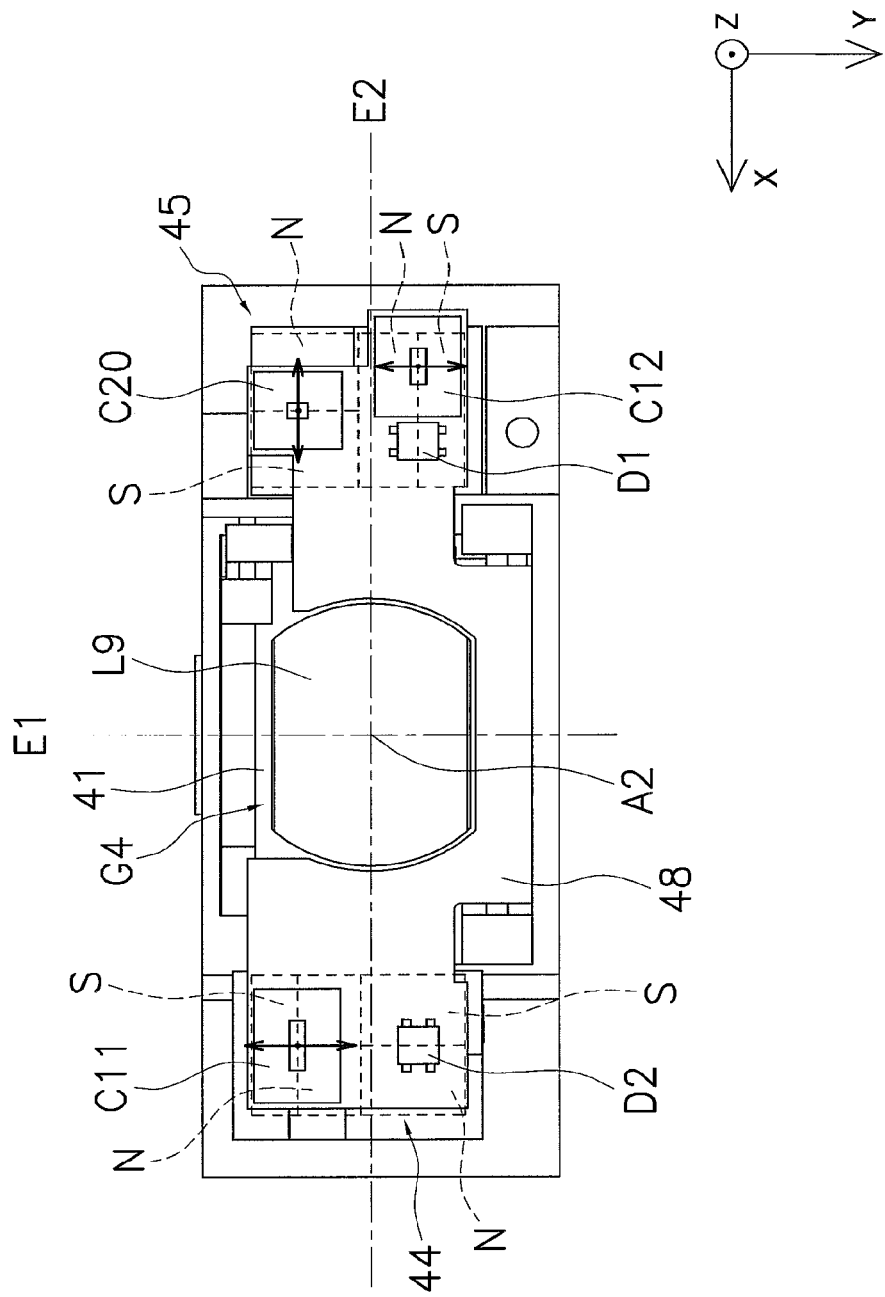
FIG. 21 is a simplified plan view of a lens barrel.

FIGS. 16 to 21 are simplified plan views of the lens barrel 3 as viewed in the Z axial direction. In FIG. 16, a part of the main body frame 70 is omitted. In FIG. 17, a first driving unit 50 and a second driving unit 60 are omitted. In FIG. 18, the second support frame 20 is omitted. In FIG. 19, a shutter unit 29 is omitted. FIG. 20 is a simplified plan view of a lens driving device 40. In FIG. 21, a first yoke 46 and a second yoke 47 are omitted.

As shown in FIGS. 3 to 8, the lens barrel 3 has the imaging optical system (which employs a bending optical system for bending the optical path), a first support frame 10, the second support frame 20, a third support frame 30, the first driving unit 50, the second driving unit 60, the main body frame 70, the aperture unit 22, the shutter unit 29, and the lens driving device 40 (which supports a fourth lens group G4 of the imaging optical system).

(1) Imaging Optical System

As shown in FIG. 9, the imaging optical system has the first lens group G1, the second lens group G2, a third lens group G3, and the fourth lens group G4.

The first lens group G1 is a lens group that overall has negative refractive power, and is provided so as to take in the light beam incident along a first optical axis A1 from the subject. More specifically, the first lens group G1 is supported by the first support frame 10, and has a first lens L1, a prism PR (an example of a bending optical element), a second lens L2, and a third lens L3. The first lens L1 has the first optical axis A1, and the second lens L2 and third lens L3 have a second optical axis A2 that is substantially perpendicular to the first optical axis A1. The prism PR can be, for example, an internal reflection prism, and has a reflection face PR1 that reflects the light beam incident along the first optical axis A1, in a direction along the second optical axis A2.

The second lens group G2 is a lens group that overall has positive refractive power, and takes in light that has been bent by the first lens group G1. More specifically, the second lens group G2 is supported by the second support frame 20, and has a fourth lens L4, a fifth lens L5, a sixth lens L6, and a seventh lens L7.

The fourth to seventh lenses L4 to L7 are supported by the second support frame 20 so that the optical axes of the fourth to seventh lenses L4 to L7 coincide with the second optical axis A2. The second support frame 20 is provided so as to be capable of moving in a direction along the second optical axis A2 with respect to the main body frame 70, and the fourth to seventh lenses L4 to L7 move integrally in a direction along the second optical axis A2 from the wide angle end toward the telephoto end. Therefore, the second lens group G2 can function as a variable power group for varying the power of the imaging optical system.

The third lens group G3 has an eighth lens L8 that takes in a light beam that has passed through the second lens group G2, and has positive refractive power. The eighth lens L8 is supported by the third support frame 30 so that the optical axis of the eighth lens L8 coincides with the second optical axis A2. The third support frame 30 is provided so as to be capable of moving in a direction along the second optical axis A2 with respect to the main body frame 70, and the eighth lens L8 moves in a direction along the second optical axis A2 from the wide angle end toward the telephoto end. Therefore, the eighth lens L8 can function as a focusing lens.

The fourth lens group G4 has a ninth lens L9 that takes in a light beam that has passed through the third lens group G3, and functions as an image blur correcting lens. The ninth lens L9 is supported by the lens driving device 40 (discussed below; an example of the third driving unit) so as to be capable of moving within a plane that is perpendicular to the second optical axis A2. The optical axis of the fourth lens group G4 faces in substantially the same direction as the second optical axis A2. The fourth lens group G4 does not move in a direction along the second optical axis A2.

The aperture stop of this imaging optical system is always located on the first lens group G1 of the second lens group G2, so the position of this aperture stop moves along the second optical axis A2, from the wide angle end toward the telephoto end, along with the second lens group G2 and the third lens group G3. The aperture unit 22 (a luminous energy adjusting unit) is disposed at the location of this aperture stop. The aperture unit 22 is fixed to the second support frame 20, and moves along with the second lens group G2 in a direction along the second optical axis A2. The aperture unit 22 will be discussed below.

(2) First Support Frame

The imaging optical system described above is supported by various support frames. More specifically, as shown in FIGS. 5 to 8, the first lens group G1 is fixed by adhesive bonding, for example, to the first support frame 10. The first support frame 10 is fixed to the end of the main body frame 70 on the Z axis positive direction side. The first support frame 10 has a first support frame main body 11 and a forward portion 12. As shown in FIG. 12, the prism PR, the second lens L2, and the third lens L3 of the first lens group G1 are fixed to the first support frame main body 11. The first lens L1 is fixed to the forward portion 12.

As shown in FIG. 5, part of the main body frame 70 and the first support frame 10 overlap when viewed in a direction along the first optical axis A1. More specifically, as shown in FIG. 12, the main body frame 70 has a forward plate 71 that is disposed on the Y axis positive direction side of the second lens group G2 and the third lens group G3 and extends in the Z axial direction, and the forward portion 12 of the first support frame 10 is disposed on the Z axis positive direction side of the forward plate 71.

The forward portion 12 has a first protrusion 12a that protrudes in a direction along the second optical axis A2, and a second protrusion 12b that protrudes in a direction along the first optical axis A1. The first protrusion 12a is disposed on the Y axis negative direction side of the forward plate 71. The forward plate 71 has a recess 71a that is recessed on the Z axis negative direction side. The second protrusion 12b is inserted into the recess 71a.

(3) Second Support Frame

Returning to FIG. 5, the second lens group G2 is fixed by adhesive bonding, for example, to the second support frame 20. A first guide shaft 59 and a second guide shaft 69 are fixed to the main body frame 70. The second support frame 20 is supported by the first guide shaft 59 and the second guide shaft 69 so as to be capable of moving along the second optical axis A2.

More specifically, the second support frame 20 has a second support frame main body 21 to which the second lens group G2 is fixed, a first guide portion 23 that slides with the first guide shaft 59, a second guide portion 24 that slides with the second guide shaft 69, and a first drive member 25 that receives the drive force generated by the first driving unit 50. The second support frame 20, the first guide shaft 59, and the second guide shaft 69 constitute a first support mechanism S1 for movably supporting the second lens group G2. The second support frame 20 is guided mainly by the first guide shaft 59. The second guide shaft 69 prevents the second support frame 20 from rotating around the first guide shaft 59.

As shown in FIG. 13, the second support frame main body 21 is cylindrical in shape, and has an opening 21a, two first bonding grooves 21b for bonding the fifth lens L5, and two second bonding grooves 21c for bonding the seventh lens L7. The first bonding grooves 21b are disposed flanking the second optical axis A2. The two second bonding grooves 21c are also disposed flanking the second optical axis A2. The first bonding grooves 21b and second bonding grooves 21c can be disposed alternately at a constant pitch in the circumferential direction.

The first bonding grooves 21b are formed deeper than the second bonding grooves 21c, and as shown in FIG. 14A, they extend in a direction along the second optical axis A2 to the outer peripheral side of the fifth lens L5. The outer peripheral face of the fifth lens L5 is mated to the opening 21a. An annular ridge 21e is formed on the fourth lens L4 side of the opening 21a. The fifth lens L5 comes into contact with the annular ridge 21e so that the annular ridge 21e positions the fifth lens L5 with respect to the second support frame 20 in a direction along the second optical axis A2. The sixth lens L6 is joined on the seventh lens L7 side of the fifth lens L5. The first bonding grooves 21b are filled with an adhesive (not shown), which fixes the fifth lens L5 to the second support frame 20.

Meanwhile, the second bonding grooves 21c are formed shallower than the first bonding grooves 21b, and as shown in FIG. 14B, they do not extend all the way to the outer peripheral side of the fifth lens L5. The seventh lens L7 comes into contact with an annular face 21d, and this annular face 21d positions the seventh lens L7 with respect to the second support frame 20 in a direction along the second optical axis A2. The second bonding grooves 21c are filled with an adhesive (not shown), and this fixes the seventh lens L7 to the second support frame 20.

(4) First Driving Unit

The second support frame 20 is driven by the first driving unit 50. More specifically, the first driving unit 50 has a first drive motor 51, a first lead screw 52 (an example of a first drive shaft) that is rotationally driven by the first drive motor 51, and a first frame 53 that supports the first drive motor 51 and the first lead screw 52.

The first drive member 25 threads onto the first lead screw 52. The first drive member 25 is supported by the second support frame main body 21 so as to be rotatable and to move integrally in the axial direction. With this configuration, when the first lead screw 52 turns, the second support frame 20 moves along the second optical axis A2.

(5) Aperture Unit and Shutter Unit

The aperture unit 22 and the shutter unit 29 are fixed to the second support frame 20. The aperture unit 22 is fixed on the first lens group G1 side of the second support frame 20, and the shutter unit 29 is fixed on the imaging unit 90 side of the second support frame 20 (the opposite side from the first lens group G1 side).

The aperture unit 22 has a stop mechanism 22a (an example of a stop member) with which the rotational force around the second optical axis A2 can be utilized to adjust the aperture, and a drive lever 22b provided so as to be capable of transmitting rotational force to the stop mechanism 22a. As shown in FIG. 10, part of the convex face L4a of the fourth lens L4 is disposed within the opening of the stop mechanism 22a. That is, when viewed in a direction along the first optical axis A1, part of the fourth lens L4 goes inside the aperture unit 22, and part of the fourth lens L4 overlaps the aperture unit 22.

As shown in FIG. 4, the main body frame 70 has a guide portion 72 with which the linear motion of the second support frame 20 with respect to the main body frame 70 in a direction along the second optical axis A2 is converted into rotary motion of the drive lever 22b around the second optical axis A2. More specifically, as shown in FIGS. 4, 15A, and 15B, the drive lever 22b extends from the stop mechanism 22a in a direction that is perpendicular to the second optical axis A2. FIG. 15A shows a state in which the aperture unit 22 has been stopped, while FIG. 15B shows a state in which the aperture unit 22 has been opened.

The guide portion 72 has a guide groove 72a into which the drive lever 22b is inserted. The guide groove 72a slants in a direction along the second optical axis A2. When the second support frame 20 moves along the second optical axis A2, the drive lever 22b moves through the guide groove 72a, and the drive lever 22b rotates around the second optical axis A2 with respect to the second support frame 20. This allows the drive of the stop mechanism 22a to be performed by the first driving unit 50.

The shutter unit 29 has a shutter mechanism 29a provided so that the optical path along the second optical axis A2 can be opened or blocked off, and a shutter drive motor 27 that drives the shutter mechanism 29a. The shutter drive motor 27 is disposed more to the first lens group G1 side than the shutter mechanism 29a in a direction along the second optical axis A2.

Further, the shutter unit 29 is provided with a neutral density filter 26 (an example of an optical element; see FIG. 18) provided so as to be capable of being inserted into the optical path along the second optical axis A2 and being retracted from the optical path, and a filter drive motor 28 (an example of an element drive motor) that drives the neutral density filter 26. The filter drive motor 28 is disposed more to the first lens group G1 side than the neutral density filter 26 in a direction along the second optical axis A2.

(6) Third Support Frame

As shown in FIGS. 5 to 11, the third lens group G3 is fixed to the third support frame 30 by adhesive bonding, for example. The third support frame 30 is supported movably along the second optical axis A2 by the first guide shaft 59 and the second guide shaft 69. More specifically, the third support frame 30 has a third support frame main body 31 to which the third lens group G3 is fixed, a third guide portion 33 that slides with the second guide shaft 69, a fourth guide portion 34 that slides with the first guide shaft 59, and a second drive member 35 that receives the drive force generated by the second driving unit 60.

The third support frame 30, the first guide shaft 59, and the second guide shaft 69 constitute a second support mechanism S2 for movably supporting the third lens group G3. The third support frame 30 is mainly guided by the second guide shaft 69. The first guide shaft 59 prevents the third support frame 30 from rotating around the second guide shaft 69.

(7) Second Driving Unit

The third support frame 30 is driven by the second driving unit 60. More specifically, the second driving unit 60 has a second drive motor 61, a second lead screw 62 (an example of a second drive shaft) that is rotationally driven by the second drive motor 61, and a second frame 63 that supports the second drive motor 61 and the second lead screw 62. The second drive member 35 is threaded onto the second lead screw 62. The second drive member 35 is supported by the third support frame main body 31 so as to be rotatable and to move integrally in the axial direction. With this configuration, when the second lead screw 62 turns, the third support frame 30 moves along the second optical axis A2.

(8) Lens Driving Device

The lens driving device 40 is disposed on the Z axis negative direction side of the main body frame 70, and the fourth lens group G4 is supported by this lens driving device 40 so as to be capable of moving within a plane that is perpendicular to the second optical axis A2. More specifically, the lens driving device 40 has a base plate 43, a fifth support frame 42 that is supported movably in the Y axis direction by the base plate 43, a fourth support frame 41 that is supported movably in the X axis direction by the fifth support frame 42, and an electrical board 48 fixed to the fourth support frame 41. The base plate 43 is fixed to the main body frame 70 by a fixing member (not shown), for example.

Further, as shown in FIG. 21, the lens driving device 40 has a first coil C11, a second coil C12, a third coil C20, a first magnet 44, a second magnet 45, a first yoke 46, and a second yoke 47. The first coil C11 and the second coil C12 are used to drive the fourth support frame 41 in the pitch direction (Y axis direction), and are disposed at the X axial ends of the electrical board 48 so as to flank the second optical axis A2. The third coil C20 is used to drive the fourth support frame 41 in the yaw direction (X axis direction), and is disposed on the Y axis negative direction side of the second coil C12.

The first yoke 46 and the second yoke 47 are fixed to the base plate 43. The first magnet 44 is fixed to the first yoke 46 so as to be opposite the first coil C11 in the Z axis direction, and the second magnet 45 is fixed to the second yoke 47 so as to be opposite the third coil C20 in the Z axis direction.

The lens driving device 40 has a pitch position sensor D1 and a yaw position sensor D2. The pitch position sensor D1 is used to detect the position of the fourth support frame 41 in the pitch direction. The yaw position sensor D2 is used to detect the position of the fourth support frame 41 in the yaw direction. The pitch position sensor D1 and the yaw position sensor D2 allow the position of the fourth support frame 41 to be detected.

As shown in FIG. 21, the portion of the first magnet 44 corresponding to the first coil C11 is subjected to dipolar magnetization so as to line up in the Y axis direction. The portion of the first magnet 44 corresponding to the second coil C12 is subjected to dipolar magnetization so as to line up in the X axis direction. The portion of the second magnet 45 corresponding to the second coil C12 and the pitch position sensor D1 is subjected to dipolar magnetization so as to line up in the Y axis direction. The portion of the second magnet 45 corresponding to the third coil C20 is subjected to dipolar magnetization so as to line up in the X axis direction.

As discussed above, the first coil C11, the second coil C12, the first magnet 44, the second magnet 45, the first yoke 46, and the second yoke 47 constitute a pitch driving unit 81 that drives the fourth support frame 41 in the pitch direction. The third coil C20, the second magnet 45, and the second yoke 47 constitute a yaw driving unit 82 that drives the fourth support frame 41 in the yaw direction.

Movement Region of Second and Third Support Frames

The region of movement of the second support frame 20 and the third support frame 30 will now be described.

As shown in FIG. 10, the second support frame 20 moves from the wide angle end to the telephoto end of the imaging optical system O, within the range of a first stroke M23, along the second optical axis A2. In FIG. 10, the first stroke M23 is shown using the first drive member 25 as a reference. If we let a first dimension M22 be the dimension of the first drive member 25 in a direction along the second optical axis A2, then the region occupied by the first drive member 25 within the range from the wide angle end to the telephoto end is a first movement region M21.

Meanwhile, the third support frame 30 moves from the wide angle end to the telephoto end, within the range of a second stroke M33, along the second optical axis A2. In FIG. 10, the second stroke M33 is shown using the second drive member 35 as a reference. If we let a second dimension M32 be the dimension of the second drive member 35 in a direction along the second optical axis A2, then the region occupied by the second drive member 35 within the range from the wide angle end to the telephoto end is a second movement region M31.

It can be seen from FIG. 10 that the first movement region M21 partially overlaps the second movement region M31. Further, the first stroke M23 partially overlaps the second stroke M33. As a result, the size of the lens barrel 3 can be reduced in a direction along the second optical axis A2.

Features of Layout

The layout of the constituent components of the lens barrel 3 has the following features. Specifically, when viewed in a direction along the second optical axis A2, the first driving unit 50 and the second driving unit 60 are disposed flanking the second optical axis A2. Specifically, as shown in FIGS. 16 to 21, when a first boundary E1 is set extending in the Y axis direction and intersecting the second optical axis A2, the first driving unit 50 and the second driving unit 60 are disposed on both sides, flanking the first boundary E1. The first driving unit 50 is disposed at the end of the lens barrel 3 on the X axis positive direction side, and the second driving unit 60 is disposed at the end of the lens barrel 3 on the X axis negative direction side.

When a second boundary E2 is set extending in the X axis direction and intersecting the second optical axis A2, the first driving unit 50 and the second driving unit 60 are disposed on both sides, flanking the second boundary E2. In more specific terms, a first rotational center R1 of the first lead screw 52 of the first driving unit 50 is disposed more to the Y axis positive direction side than the second optical axis A2. A second rotational center R2 of the second lead screw 62 of the second driving unit 60 is disposed more to the Y axis negative direction side than the second optical axis A2. The second optical axis A2 is disposed near or on a line connecting the first rotational center R1 and the second rotational center R2. The first guide shaft 59 is disposed near the first driving unit 50. The second guide shaft 69 is disposed near the second driving unit 60.

Also, the first driving unit 50 and/or the second driving unit 60 overlap the lens driving device 40. In more specific terms, the first driving unit 50 overlaps the yaw driving unit 82, and the second driving unit 60 overlaps the pitch driving unit 81.

Further, as shown in FIGS. 5 and 6, the outer end of the first driving unit 50 on the opposite side from the second optical axis (more specifically, a first outer end face 53a of the first frame 53) is disposed at substantially the same position (the position in the X axis direction) as the outer end of the yaw driving unit 82 on the opposite side from the second optical axis A2.

The outer end of the second driving unit 60 on the opposite side from the second optical axis (more specifically, a third outer end face 63a of the second frame 63) is disposed at substantially the same position (the position in the X axis direction) as the outer end of the pitch driving unit 81 on the opposite side from the second optical axis A2.

As shown in FIGS. 5 and 6, the first drive motor 51 is disposed closer to the first lens group G1 than the second drive motor 61 in a direction along the second optical axis A2. The first drive motor 51 is disposed more to the Z axis positive direction side than the second drive motor 61. The first drive motor 51 is disposed to the side in the X axis direction of the first support frame 10 and the first lens group G1.

As shown in FIGS. 6 to 21, the shutter drive motor 27 and the filter drive motor 28 are disposed flanking the second optical axis A2. More specifically, the first guide shaft 59 and the second guide shaft 69 are disposed flanking the first boundary E1. When viewed in a direction along the second optical axis A2, the first guide shaft 59 and the second guide shaft 69 are disposed flanking the second optical axis A2. When viewed in a direction along the second optical axis A2, the first guide shaft 59 is disposed near the filter drive motor 28, and the second guide shaft 69 is disposed near the shutter drive motor 27.

To summarize the above layout, the first driving unit 50, the first guide shaft 59, and the filter drive motor 28 are disposed on the X axis negative direction side of the first boundary E1, and the second driving unit 60, the second guide shaft 69, and the shutter drive motor 27 are disposed on the X axis positive direction side of the first boundary E1.

Also, the first driving unit 50, the first guide shaft 59, and the shutter drive motor 27 are disposed on the Y axis positive direction side of the second boundary E2, and the second driving unit 60, the second guide shaft 69, and the filter drive motor 28 are disposed on the Y axis negative direction side of the second boundary E2.

Operation of Digital Camera

The operation of the digital camera 1 will be described. The basic operation of the digital camera 1 will be skipped, since it is no different from the basic operation of a conventional camera.

(1) Zoom Operation During Imaging

With the power on, the imaging optical system is set to the wide angle end (the state shown in FIG. 10), for example. When the zoom adjusting lever 7 is turned to the telephoto side, the second support frame 20 and the third support frame 30 are driven in a direction along the second optical axis A2 by the first driving unit 50 and the second driving unit 60 according to the rotational angle and operation time of the zoom adjusting lever 7. More specifically, when the first lead screw 52 is rotationally driven by the first drive motor 51 of the first driving unit 50, the second support frame 20 moves along the second optical axis A2 to the first lens group G1 side (see FIG. 11, for example). When the second lead screw 62 is rotationally driven by the second drive motor 61 of the second driving unit 60, the third support frame 30 moves along the second optical axis A2 to the first lens group G1 side (see FIG. 11, for example). The second support frame 20 moves linearly from the wide angle end to the telephoto end, but the third support frame 30 turns back to the imaging unit 90 side midway, and again moves to the first lens group G1 side.

When the zoom adjusting lever 7 is turned to the wide angle side, the second support frame 20 is driven to the imaging unit 90 side by the first driving unit 50 according to the rotational angle and operation time of the zoom adjusting lever 7, and the third support frame 30 is driven to the imaging unit 90 side by the second driving unit 60.

Thus, when the second lens group G2 and the third lens group G3 move along the second optical axis A2, the magnification ratio of the imaging optical system increases.

(2) Operation of Aperture Unit

The drive lever 22b is provided to the aperture unit 22 fixed to the second support frame 20, and the end of the drive lever 22b is inserted into the guide groove 72a formed in the guide portion 72 of the main body frame 70. Accordingly, when the second support frame 20 moves along the second optical axis A2, as shown in FIGS. 15A and 15B, the drive lever 22b is guided by the guide groove 72a so as to rotate around the second optical axis A2. As a result, the aperture unit 22 changes between the stopped state shown in FIG. 15A and the open state shown in FIG. 15B, and the luminous energy is adjusted by the aperture unit 22 of the imaging optical system.

(3) Operation of Lens Driving Device

The fourth lens group G4 is driven by the lens driving device 40 according to the amount of shake in the pitch and yaw directions detected by a shake detection sensor. More specifically, the amount of drive of the fourth lens group G4 in the pitch and yaw directions is calculated by a control unit (not shown) on the basis of the shake amount and positional information detected by a position sensor. Current corresponding to this drive amount is supplied to the first coil C11, the second coil C12, and the third coil C20. As a result, the fourth support frame 41 is driven in the pitch and yaw directions, and the optical path is adjusted by the fourth lens group G4 so that there will be no blurring of the image. This allows the position of the optical image of the subject to be adjusted according to the shaking of the digital camera 1, so image blur can be corrected.

Features of Lens Barrel

Features of the lens barrel 3 are as follows.

(1) With this lens barrel 3, the first lens group G1 has an overall negative refractive power, which is advantageous in terms of achieving a wider angle, as compared to when the overall refractive power is positive, for example.

In addition, since part of the first movement region M21 in which the second support frame 20 moves overlaps with the second movement region M31 in which the third support frame 30 moves, the length of the lens barrel 3 in a direction along the second optical axis A2 can be reduced.

Thus, this lens barrel 3 has a wider angle and is more compact.

(2)

Since the first driving unit 50 and the second driving unit 60 are disposed flanking the second optical axis A2, when viewed in a direction along the second optical axis A2, the overall lens barrel 3 is longer in the X axis direction and shorter in the Y axis direction. This affords a lens barrel 3 that is thinner.

(3)

When viewed in a direction along the second optical axis A2, the first driving unit 50 overlaps the yaw driving unit 82, and the second driving unit 60 overlaps the pitch driving unit 81. Therefore, the pitch driving unit 81 and the yaw driving unit 82 protrudes less in a direction (such as the Y axis direction) that is different from the direction in which the first driving unit 50 and the second driving unit 60 are aligned. This means that the lens barrel 3 can be shorter in the Y axis direction, affording a thinner lens barrel 3.

(4)

When viewed in a direction along the second optical axis A2, the first outer end face 53a of the first frame 53 of the first driving unit 50 is disposed at substantially the same position in the X axis direction as the outer end face 47a of the second yoke 47 of the yaw driving unit 82. Therefore, it is less likely that there will be wasted space formed in the portion to the side of the lens barrel 3 on the side where the first driving unit 50 is disposed. This means that the various units can be disposed more efficiently, and the lens barrel 3 can be even more compact.

In particular, with this lens barrel 3, the first driving unit 50 and the yaw driving unit 82 are disposed at the end of the camera main body 2 on the X axis negative direction side, so layout efficiency is higher.

Also, if there is some extra space around the yaw driving unit 82, a larger driving unit can be employed as the yaw driving unit 82, which means that the lens barrel 3 can be made smaller while achieving a more stable drive state for the fourth lens group G4.

The state here in which "the first outer end face 53a is disposed at substantially the same position as the second outer end face 47a of the yaw driving unit 82" encompasses not only a state in which the first outer end face 53a and the second outer end face 47a are disposed at exactly the same position, but also a state in which the first outer end face 53a and the second outer end face 47a are shifted to the extent that a reduction in the size of the lens barrel 3 can still be achieved.

(5)

Also, when viewed in a direction along the second optical axis A2, the third outer end face 63a of the second frame 63 of the second driving unit 60 is disposed at substantially the same position as the fourth outer end face 46a of the first yoke 46 of the pitch driving unit 81. Therefore, it is less likely that there will be wasted space formed in the portion to the side of the lens barrel 3 on the side where the 60 is disposed. This means that the various units can be disposed more efficiently, and the lens barrel 3 can be even more compact.

Also, if there is some extra space around the pitch driving unit 81, a larger driving unit can be employed as the pitch driving unit 81, which means that the lens barrel 3 can be made smaller while achieving a more stable drive state for the fourth lens group G4.

The state here in which "the third outer end face 63a of the second driving unit 60 is disposed at substantially the same position as the fourth outer end face 46a of the pitch driving unit 81" encompasses not only a state in which the third outer end face 63a and the fourth outer end face 46a are disposed at exactly the same position, but also a state in which the third outer end face 63a and the fourth outer end face 46a are shifted to the extent that a reduction in the size of the lens barrel 3 can still be achieved.

(6)

The first drive motor 51 is disposed on the first lens group G1 side of the second support frame 20, and the second drive motor 61 is disposed on the first lens group G1 side of the third support frame 30. Therefore, the space around the first lens group G1 can be utilized more effectively, and the size of the lens barrel 3 can be reduced in a direction along the second optical axis A2.

In particular, when another fourth lens group G4 and the lens driving device 40 are disposed on the opposite side of the third lens group G3 from the first lens group G1, the lens driving device 40 will be less likely to be affected by changes in the magnetic field caused by the first drive motor 51 and the second drive motor 61, and drive of the lens driving device 40 will be less likely to be hindered.

(7)

Since the first drive motor 51 is disposed closer to the first lens group G1 than the second drive motor 61, the second lens group G2, which is driven by the first drive motor 51, can be moved closer to the first lens group G1. The space on the Z axis positive direction side of the second drive motor 61 can also be utilized more effectively.

(8)

When viewed in a direction along the second optical axis A2, part of the main body frame 70 overlaps the first support frame 10, so it is less likely that part of the light incident on the first lens group G1 from a direction along the second optical axis A2 will leak into the interior from the gap formed between the first support frame 10 and the main body frame 70. That is, with this lens barrel 3, there is less of a decrease in optical performance. In particular, since the above-mentioned features are obtained when viewed from the front face, it is even less likely that part of the light incident from the front face side (that is, from the subject side) will leak into the interior from the gap formed between the first support frame 10 and the main body frame 70.

Also, since the first protrusion 12a of the first support frame 10 overlaps the Z axis positive direction end of the guide portion 72 of the main body frame 70 in the Y axis direction, the leakage of light into the interior of the barrel can be reduced with a simple configuration.

Furthermore, since the second protrusion 12b of the first support frame 10 is inserted into the recess 71a of the forward plate 71, the end of the forward plate 71 can be covered by the second protrusion 12b, and this further reduces the entrance of stray light.

(9)

With the lens driving device 40, since the electrical board 48 (which functions as a driven member) is disposed on the first lens group G1 side of the fourth support frame 41, the positions of the pitch driving unit 81 and the yaw driving unit 82 move to the first lens group G1 more than when the disposition is on the opposite side from the first lens group G1 side. Accordingly, space can be ensured at both ends in the X axis direction and on the Z axis negative direction side of the lens driving device 40. This space can be effectively utilized in the fixing of the lens barrel 3 to the camera main body 2. For example, screws or other such fixing members can be disposed in this space. This improves the layout efficiency of the lens driving device 40.

Also, the positions of the pitch driving unit 81 and the yaw driving unit 82 are closer to the third support frame 30, so the overall layout efficiency of the lens barrel 3 is also improved.

(10)

Since the aperture unit 22 and the shutter unit 29 are fixed to the second support frame 20, this means that the second support frame 20, the aperture unit 22, and the shutter unit 29 can share the first driving unit 50, so there is no need to provide a separate driving device for the aperture unit 22 and the shutter unit 29. This allows the lens barrel 3 to have a simpler configuration and lowers the manufacturing cost.

(11)

Since the aperture unit 22 is disposed on the first lens group G1 side of the second support frame 20, the first lens group G1 (and particularly the prism PR) can be smaller, and the lens barrel 3 can be more compact.

(12)

Since the shutter unit 29 is disposed on the opposite side of the second support frame 20 from the first lens group G1 side, the second lens group G2 can move closer to the first lens group G1. This affords a better variable power ratio, and allows a lens barrel 3 that is smaller and higher in power to be obtained.

(13)

Since the shutter drive motor 27 is disposed more to the first lens group G1 side than the shutter mechanism 29a in a direction along the second optical axis A2, this prevents the shutter drive motor 27 from interfering with the lens driving device 40. In other words, the space on the first lens group G1 side of the shutter mechanism 29a can be used more effectively. This allows the lens barrel 3 to be more compact.

(14)

Since the main body frame 70 has the guide portion 72, when the second support frame 20 moves linearly in a direction along the second optical axis A2, the guide groove 72a of the guide portion 72 causes the drive lever 22b to rotate around the second optical axis A2, and this rotational force acts on the stop mechanism 22a. Therefore, the first driving unit 50 can be utilized to open and close the aperture unit 22, so a driving device for the aperture unit 22 can be omitted. This simplifies the configuration of the lens barrel 3, allows it to be more compact, and lowers its manufacturing cost.

(15)

Since at least part of the convex face L4a of the fourth lens L4 is disposed inside the opening of the aperture unit 22, the aperture unit 22 can be disposed closer to the fourth lens L4. This shortens the overall length of the fourth lens L4 and the aperture unit 22, and reduces the size of the lens barrel 3. This also allows the second lens group G2 to move closer to the first lens group G1. As a result, a higher magnification ratio can be obtained, and the lens barrel 3 will be smaller and have higher power.

(16)

When viewed in a direction along the second optical axis A2, the shutter drive motor 27 and the filter drive motor 28 are disposed flanking the second optical axis A2, so the shutter unit 29 is longer in the X axis direction, and the shutter unit 29 is shorter in the Y axis direction. This means that a thinner lens barrel 3 can be obtained.

(17)

When viewed in a direction along the second optical axis A2, the first guide shaft 59 and the second guide shaft 69 are disposed flanking the second optical axis A2, so the lens barrel 3 is longer in the X axis direction, but shorter in the Y axis direction. This means that a thinner lens barrel 3 can be obtained.

(18)

When viewed in a direction along the second optical axis A2, the first guide shaft 59 is disposed closer to the filter drive motor 28, and the second guide shaft 69 is disposed closer to the shutter drive motor 27. Therefore, the lens barrel 3 is longer in the X axis direction, but shorter in the Y axis direction. This means that a thinner lens barrel 3 can be obtained.

(19)

The shutter drive motor 27 and the second guide shaft 69 are disposed on one side (the X axis positive direction side) with respect to a plane that includes the first optical axis A1 and the second optical axis A2, and the filter drive motor 28 and the first guide shaft 59 are disposed on the other side (the X axis negative direction side) with respect to the plane that includes the first optical axis A1 and the second optical axis A2. When viewed in a direction along the first optical axis A1, and from the side (Y axis positive direction side) where the shutter drive motor 27 is disposed in front of the second guide shaft 69, the first guide shaft 59 is disposed in front (on the Y axis positive direction side) of the filter drive motor 28. This means that the lens barrel 3 is shorter in the Y axis direction.

The distance between the first guide shaft 59 and the second guide shaft 69 can be increased within the X axial range of the lens barrel 3. This means that the lens barrel 3 can be thinner and more compact. Also, the second support frame 20 and the third support frame 30 can be smoothly guided in a direction along the second optical axis A2.

(20)

With a conventional method for bonding lenses, for example, a second lens is flanked by a support frame and a first lens, and the first lens is adhesively fixed to the support frame. In this case, since the second lens is not bonded, it is not completely fixed, and there is the risk that the second lens will move with respect to the support frame.

However, as shown in FIGS. 13, 14A, and 14B, with this lens barrel 3, since two kinds of groove, the first bonding grooves 21b and the second bonding grooves 21c, are formed in the second support frame 20, the fifth lens L5 and the sixth lens L6 can be individually bonded and fixed to the second support frame 20. This prevents a shift in the relative positions of the fifth lens L5 and the sixth lens L6, and a lens support structure that minimizes a decrease in optical performance can be achieved with a simple configuration.

OTHER EMBODIMENTS

The lens barrel according to the present invention is not limited to the embodiment given above, and various changes and modifications are possible without departing from the gist of the present invention.

(1)

The lens barrel 3 discussed above can be applied not only to a digital camera, but also to a mobile telephone, a PDA (personal digital assistant), and other such imaging devices.

(2)

In the above embodiment, the lens driving device 40 has the pitch driving unit 81 and the yaw driving unit 82 disposed at different positions, but it is also possible for these driving devices to be disposed integrally. In this case, when viewed in a direction along the second optical axis A2, a thinner lens barrel 3 can be obtained if the first driving unit 50 or the second driving unit 60 overlaps this integrated driving device.

Also, the pitch driving unit 81 and the yaw driving unit 82 may each include a plurality of driving devices.

(3)

The first driving unit 50 and the second driving unit 60 may be other kinds of driving devices, such as an electromagnetic actuator.

(4)

In the above embodiment, the first guide shaft 59 and the filter drive motor 28 are disposed on the X axis negative direction side of the first boundary E1, and the second guide shaft 69 and the shutter drive motor 27 are disposed on the X axis positive direction side of the first boundary E1, but these layouts may be reversed in the X axis direction. That is, the first guide shaft 59 and the filter drive motor 28 may be disposed on the X axis positive direction side of the first boundary E1, and the second guide shaft 69 and the shutter drive motor 27 may be disposed on the X axis negative direction side of the first boundary E1.

Also, the layout of the first guide shaft 59 and the second guide shaft 69 may be reversed in the X axis direction. That is, the second guide shaft 69 and the filter drive motor 28 may be disposed on one side of the first boundary E1 (the X axis positive or negative direction side), and the first guide shaft 59 and the shutter drive motor 27 may be disposed on the other side of the first boundary E1 (the opposite side from the side where the second guide shaft 69 is disposed).

(5)

Also, in the above embodiment, the first guide shaft 59 and the shutter drive motor 27 are disposed on the Y axis positive direction side of the second boundary E2, and the second guide shaft 69 and the filter drive motor 28 are disposed on the Y axis negative direction side of the second boundary E2, but the layout of these may be reversed in the Y axis direction. That is, the first guide shaft 59 and the shutter drive motor 27 may be disposed on the Y axis negative direction side of the second boundary E2, and the second guide shaft 69 and the filter drive motor 28 may be disposed on the Y axis positive direction side of the second boundary E2.

Also, the first guide shaft 59 and the second guide shaft 69 may be reversed. That is, the second guide shaft 69 and the shutter drive motor 27 may be disposed on one side of the second boundary E2 (the Y axis positive or negative direction side), and the first guide shaft 59 and the filter drive motor 28 may be disposed on the other side of the second boundary E2 (the opposite side from the side where the second guide shaft 69 is disposed).

General Interpretation of Terms

In understanding the scope of the present invention, the term "configured" as used herein to describe a component, section, or part of a device includes hardware and/or software that is constructed and/or programmed to carry out the desired function.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms "including," "having," and their derivatives. Also, the terms "part," "section," "portion," "member," or "element" when used in the singular can have the dual meaning of a single part or a plurality of parts.

Terms that are expressed as "means-plus function" in the claims should include any structure that can be utilized to carry out the function of that part of the present invention. Finally, terms of degree such as "substantially," "about," and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A lens supporting structure, comprising:
   a first lens including an optical axis;
   a second lens arranged to be aligned with the first lens in a first direction parallel to the optical axis;
   a lens supporting frame supporting the first and second lenses, the lens supporting frame including at least one first bonding groove extending to an outer peripheral side of the first lens in the first direction and at least one second bonding groove extending to an outer peripheral side of the second lens through the outer peripheral side of the first lens in the first direction;
   a first adhesive filled in the first bonding groove and coupling the first lens to the lens supporting frame; and
   a second adhesive filled in the second bonding groove and coupling the second lens to the lens supporting frame.

2. The lens supporting structure according to claim 1, wherein
   a size of the first bonding groove in the first direction is smaller than a size of the second bonding groove in the first direction.

3. The lens supporting structure according to claim 2, wherein
   the lens supporting frame includes a first contacting face coming into contact with the first lens in the first direction and a second contacting face coming into contact with the second lens in the first direction.

4. The lens supporting structure according to claim 3, wherein
   the first contacting face is disposed to face the same side as the second contacting face in the first direction.

5. The lens supporting structure according to claim 4, wherein
   the second lens is arranged between the first and second contacting faces in the first direction.

6. The lens supporting structure according to claim 2, wherein
   an outer diameter of the second lens is smaller than an outer diameter of the first lens.

7. The lens supporting structure according to claim 2, wherein
   the lens supporting frame further includes a first and second cylindrical portions,
   the first and second bonding grooves are formed in the first cylindrical portion, and
   the second bonding groove is formed in the second cylindrical portion.

8. The lens supporting structure according to claim 7, wherein
   the first lens is disposed inside the first cylindrical portion, and
   the second lens is disposed inside the second cylindrical portion.

9. The lens supporting structure according to claim 8, wherein
   the second cylindrical portion comes into contact with the first lens in the first direction.

10. The lens supporting structure according to claim 9, wherein
    the lens supporting frame includes an annular ridge radially inwardly protruding from an inner peripheral face of the second cylindrical portion and coming into contact with the second lens in the first direction.

11. The lens supporting structure according to claim 1, wherein
    the lens supporting frame includes a first contacting face coming into contact with the first lens in the first direction and a second contacting face coming into contact with the second lens in the first direction.

12. The lens supporting structure according to claim 11, wherein
    the first contacting face is disposed to face the same side as the second contacting face in the first direction.

13. The lens supporting structure according to claim 11, wherein
    the second lens is arranged between the first and second contacting faces in the first direction.

14. The lens supporting structure according to claim 1, wherein
    an outer diameter of the second lens is smaller than an outer diameter of the first lens.

15. The lens supporting structure according to claim 1, further comprising
    a third lens attached to an end of the lens supporting frame.

16. The lens supporting structure according to claim 1, further comprising
    the second lens is arranged between the first and third lenses in the first direction.

17. A lens supporting structure, comprising:
    a first lens including an optical axis;
    a second lens arranged to be aligned with the first lens in a first direction parallel to the optical axis;
    a lens supporting frame supporting the first and second lenses, the lens supporting frame including at least one first bonding groove extending to an outer peripheral side of the first lens in the first direction and at least one second bonding groove extending to an outer peripheral side of the second lens through the outer peripheral side of the first lens in the first direction;
    a first adhesive filled in the first bonding groove and coupling the first lens to the lens supporting frame; and
    a second adhesive filled in the second bonding groove and coupling the second lens to the lens supporting frame,
    wherein
    the lens supporting frame further includes a first and second cylindrical portions, the first and second bonding grooves are formed in the first cylindrical portion, and the second bonding groove is formed in the second cylindrical portion.

18. The lens supporting structure according to claim 17, wherein the first lens is disposed inside the first cylindrical portion, and the second lens is disposed inside the second cylindrical portion.

19. The lens supporting structure according to claim 18, wherein the second cylindrical portion comes into contact with the first lens in the first direction.

20. The lens supporting structure according to claim 19, wherein the lens supporting frame includes an annular ridge radially inwardly protruding from an inner peripheral face of the second cylindrical portion and coming into contact with the second lens in the first direction.

* * * * *